(12) United States Patent
Okuda et al.

(10) Patent No.: US 9,768,422 B2
(45) Date of Patent: Sep. 19, 2017

(54) ELECTRICITY STORAGE DEVICE

(71) Applicant: KABUSHIKI KAISHA TOYOTA JIDOSHOKKI, Kariya-shi, Aichi-ken (JP)

(72) Inventors: Motoaki Okuda, Kariya (JP); Atsushi Minagata, Kariya (JP); Yohei Hamaguchi, Kariya (JP)

(73) Assignee: KABUSHIKI KAISHA TOYOTA JIDOSHOKKI, Kariyashi, Aichi-ken (JP)

( * ) Notice: Subject to any disclaimer, the term of this patent is extended or adjusted under 35 U.S.C. 154(b) by 314 days.

(21) Appl. No.: 14/391,642

(22) PCT Filed: Apr. 8, 2013

(86) PCT No.: PCT/JP2013/060643
§ 371 (c)(1),
(2) Date: Oct. 9, 2014

(87) PCT Pub. No.: WO2013/157433
PCT Pub. Date: Oct. 24, 2013

(65) Prior Publication Data
US 2015/0104694 A1 Apr. 16, 2015

(30) Foreign Application Priority Data

Apr. 17, 2012 (JP) .................... 2012-094105
Jul. 4, 2012 (JP) .................... 2012-150491

(51) Int. Cl.
H01M 2/22 (2006.01)
H01M 2/26 (2006.01)
H01M 10/04 (2006.01)
H01M 2/02 (2006.01)
H01M 2/04 (2006.01)

(52) U.S. Cl.
CPC ........... *H01M 2/0277* (2013.01); *H01M 2/22* (2013.01); *H01M 2/266* (2013.01);
(Continued)

(58) Field of Classification Search
CPC ...... H01M 2/22; H01M 2/266; H01M 2/0277; H01M 10/0413; H01M 10/0463
(Continued)

(56) References Cited

U.S. PATENT DOCUMENTS

2006/0073382 A1* 4/2006 Urano ................. H01M 2/0404
429/161
2011/0318634 A1* 12/2011 Uh .......................... H01M 2/04
429/178
(Continued)

FOREIGN PATENT DOCUMENTS

CN 102347467 A 2/2012
JP 06-310241 A 11/1994
(Continued)

OTHER PUBLICATIONS

International Search Report for PCT/JP2013/060643 dated Jun. 4, 2013.
(Continued)

*Primary Examiner* — Sean P Cullen
(74) *Attorney, Agent, or Firm* — Sughrue Mion, PLLC

(57) ABSTRACT

A positive collector and a negative collector are arranged such that connecting surfaces of the positive collector and the negative collector that are connected to collection groups face an electrode assembly. An insulator is arranged in a case between the positive and negative collectors and a terminal wall of the case. The insulator separates an opposing surface from the terminal wall. This reduces useless space and insulates the collectors and the power collection groups from the case.

11 Claims, 16 Drawing Sheets

(52) U.S. Cl.
CPC ... *H01M 10/0413* (2013.01); *H01M 10/0463* (2013.01); *H01M 2/0473* (2013.01); *H01M 2220/20* (2013.01)

(58) Field of Classification Search
USPC ........ 429/162, 163, 178, 179, 180, 181, 185
See application file for complete search history.

(56) References Cited

U.S. PATENT DOCUMENTS

| | | | |
|---|---|---|---|
| 2012/0021274 A1 | 1/2012 | Kim et al. | |
| 2012/0189899 A1 | 7/2012 | Kanda et al. | |
| 2013/0078505 A1* | 3/2013 | Kim | H01M 2/18 429/179 |

FOREIGN PATENT DOCUMENTS

| | | | | |
|---|---|---|---|---|
| JP | 06-310242 A | 11/1994 | | |
| JP | 11-195561 A | 7/1999 | | |
| JP | 11-312504 A | 11/1999 | | |
| JP | 2004-014395 A | 1/2004 | | |
| JP | 2005-032477 A | 2/2005 | | |
| JP | 2011-076840 A | 4/2011 | | |
| JP | 2011-165475 A | 8/2011 | | |
| JP | WO 2011099491 A1 * | 8/2011 | ............ | H01M 2/266 |
| JP | 2012-043578 A | 3/2012 | | |
| JP | 2012-049077 A | 3/2012 | | |
| JP | 2012-059361 A | 3/2012 | | |
| WO | 2004-021479 A1 | 3/2004 | | |
| WO | 2011/012199 A1 | 2/2011 | | |

OTHER PUBLICATIONS

International Preliminary Report on Patentability dated Oct. 21, 2014 from the International Searching Authority in counterpart Application PCT/JP2013/060643.

Communication dated Dec. 28, 2015 from the State Intellectual Property Office in counterpart application No. 201380019780.8.

* cited by examiner

Stacking direction

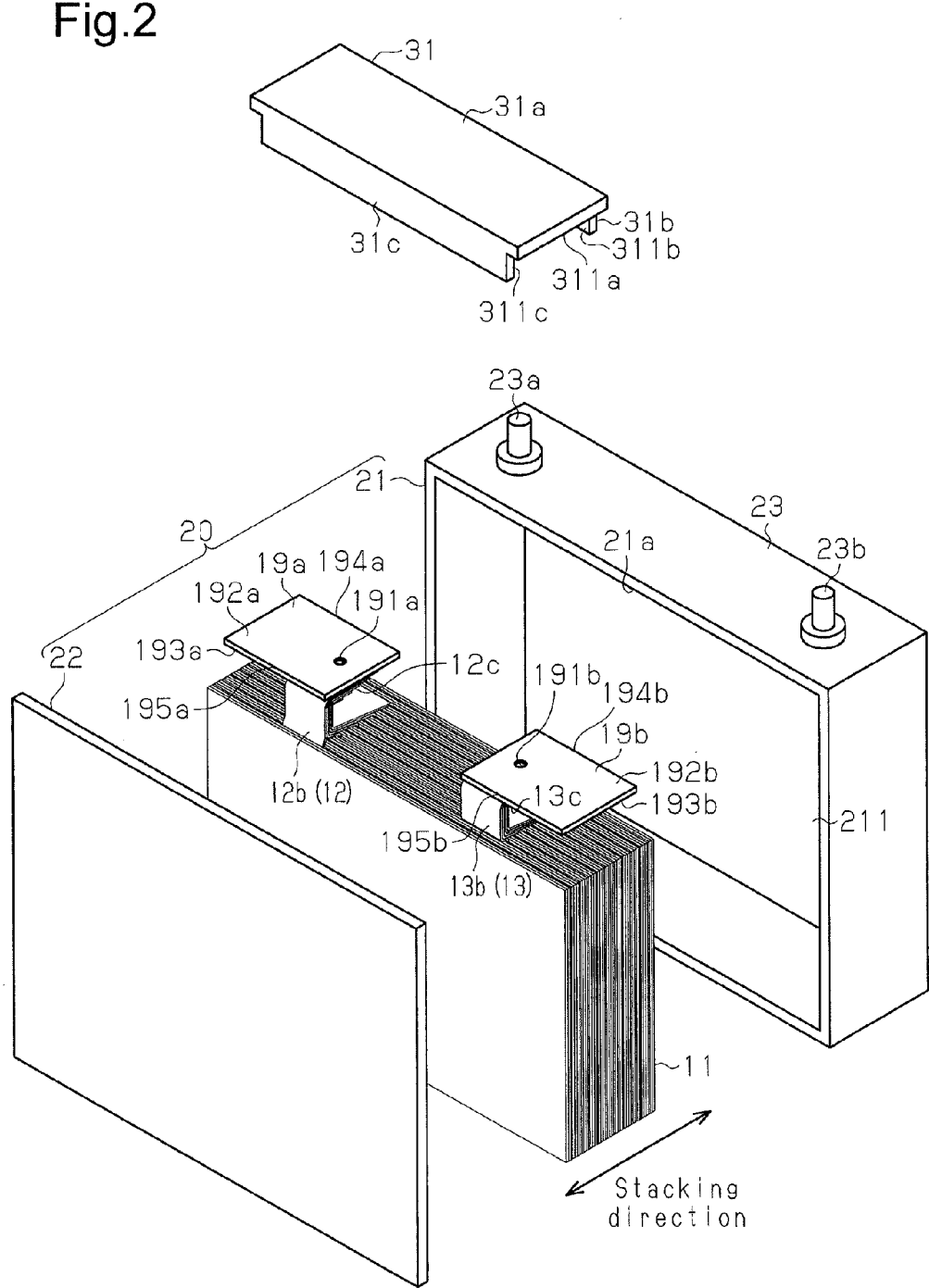

Stacking direction

Stacking direction

Stacking direction

Stacking direction

ELECTRICITY STORAGE DEVICE

CROSS REFERENCE TO RELATED APPLICATIONS

This application is a National Stage of International Application No. PCT/JP2013/060643 filed Apr. 8, 2013, claiming priority based on Japanese Patent Application Nos. 2012-094105 filed Apr. 17, 2012 and 2012-150491 filed Jul. 4, 2012, the contents of all of which are incorporated herein by reference in their entirety.

TECHNICAL FIELD

The present invention relates to a power storage device including an electrode assembly.

BACKGROUND ART

FIG. 24 shows an example of a rechargeable battery, which is one type of a power storage device. The rechargeable battery includes an electrode assembly 84 formed by spirally winding a strip of positive electrode 81, a strip of negative electrode 82, and a strip of separator 83 arranged between the electrodes 81 and 82. Specifically, the positive electrode 81 includes an active material layer 81a, to which an active material is applied, and non-application portions 81b (collection portions), to which an active material is not applied. In addition, the negative electrode 82 includes an active material layer 82a, to which an active material is applied, and non-application portions (collection portion), to which an active material is not applied. In FIG. 24, the non-application portions of the negative electrode 82 are not shown.

The positive electrode 81 and the negative electrode 82 are stacked with the separator 83 arranged in between and spirally wound with the non-application portions 81b of the positive electrode 81 and the non-application portions of the negative electrode 82 extending outward from opposite sides of the separator 83. After the positive electrodes 81, the negative electrodes 82, and the separators 83 are spirally wound, the positive electrode 81, the negative electrode 82, and the separator 83 are pressed from opposite sides in the radial directions. This forms a flat electrode assembly 84. Then, the electrode assembly 84 is placed in a case 80a, which is filled with an electrolyte, to form a rechargeable battery 80 (see Patent Document 1, for example).

The electrode assembly 84 includes a power collection group 81c, which is formed by gathering the non-application portions 81b of the positive electrode 81. The power collection group 81c extends perpendicular to the stacking direction of the electrode assembly 84. A planar collector 85 is connected to a surface of the power collection group 81c that is perpendicular to the stacking direction of the electrode assembly 84. The collector 85 is electrically connected to the positive electrode 81 by performing ultrasonic welding to join the portion where the collector 85 and the power collection group 81c are in contact. The negative electrode 82 is electrically connected to a collector (not shown) in the manner as the electric connection of the positive electrode 81 and the collector 85.

PRIOR ART DOCUMENT

Patent Document

Patent Document 1: Japanese National Phase Laid-Open Patent Publication No. 2011-76840

SUMMARY OF THE INVENTION

Problems that the Invention is to Solve

The power collection group 81c is formed by gathering the non-application portions 81b of the same length. Thus, in order to gather all of the non-application portions 81b, the non-application portions 81b need to have a length that allows for the gathering of the two non-application portions 81b located at the two opposite ends in the stacking direction of the electrode assembly 84. In addition, the surface of the power collection group 81c extending perpendicular to the stacking direction of the electrode assembly 84 needs to be formed such that the area of contact with the collector 85 is sufficient. Thus, the non-application portions 81b forming the planes of the power collection group 81c extending perpendicular to the stacking direction of the electrode assembly 84 need to have a length that allows for a sufficient area of contact with the collector 85. This elongates the non-application portions 81b in the direction perpendicular to the stacking direction of the electrode assembly 84. As a result, a larger space is needed in the case 80a to accommodate the non-application portions 81b and the power collection group 81c in the direction perpendicular to the stacking direction of the electrode assembly 84. This increases useless space that makes no contribution to the performance of the rechargeable battery 80. Further, contact of the collector 85 and the power collection group 81c with the case 80a would short-circuit the collector 85 and the power collection group 81c with the case 80a. Thus, it is desirable that the collector 85 and the power collection group 81c be insulated from the case 80a.

To solve the problems described above, it is an objective of the present invention to provide a power storage device capable of reducing useless space and insulating a collector and a power collection group from a case.

Means for Solving the Problems

To achieve the foregoing objective, one aspect of the present invention is a power storage device including an electrode assembly formed by alternately stacking positive electrodes and negative electrodes. The positive electrodes are insulated from the negative electrodes. A collector is connected to a power collection group to collect electricity from at least either one of the positive electrodes and the negative electrodes. At least either one of the positive electrodes and the negative electrodes each include an end defining a power collection portion. The power collection portions of the at least either one of the positive electrodes and the negative electrodes are gathered in the power collection group. A case accommodates the electrode assembly and the collector. The collector includes a connection surface, which faces the electrode assembly and is connected to the power collection group, and an opposing surface, which is opposite to the connection surface and faces a wall of the case. An insulator is located between the collector and the wall of the case and separates the opposing surface from the wall of the case.

In this structure, the collector is arranged such that the connection surface faces the electrode assembly. Thus, compared to the prior art, the space in the case that accommodates the power collection group is reduced in the direction perpendicular to the stacking direction of the electrode assembly. As a result, compared to the prior art, useless space is reduced that makes no contribution to the performance of the power storage device. In addition, the insulator is arranged between the collector and the wall of the case. Thus, even though the connection surface of the collector faces the electrode assembly, the insulator insulates the collector and the power collection group from the wall of the case.

In the power storage device, the insulator may include a primary insulation portion, which is located between the opposing surface and the wall of the case, and secondary insulation portions, which extend from opposite sides of the primary insulation portion toward the electrode assembly. The secondary insulation portions may be located at opposite sides of the collector in a stacking direction of the positive electrodes and the negative electrodes.

In this structure, the primary insulation portion insulates the collector and the power collection group from the wall of the case. The secondary insulation portions insulate the collector and the power collection group from the case in the stacking direction of the positive electrodes and the negative electrodes.

In the power storage device, the collector may include a positive collector and a negative collector. The positive collector and the negative collector may be respectively connected to a positive terminal and a negative terminal that extend through the wall of the case. The insulator may have a length that allows for contact with the positive terminal and the negative terminal.

In this structure, the positive terminal and the negative terminal extend through the wall of the case. This limits movement of the positive and negative terminals relative to the case. The positive terminal is connected to the positive collector, and the negative terminal is connected to the negative collector. This limits movement of the positive and negative collectors. Further, the contact between the positive and negative terminals and the insulator limits movement of the insulator toward the positive and negative terminals. This limits movement of the positive collector, the negative collector, and the insulator and thus facilitates the coupling of the electrode assembly and the insulator to the case.

In the power storage device, the insulator may include two ends respectively facing the positive terminal and the negative terminal. Each of the two ends includes an arcuate recess.

In this structure, the recesses in opposite ends of the insulator engage the positive terminal and the negative terminal. This limits movement of the insulator toward the positive terminal and the negative terminal and movement of the insulator in the stacking direction of the positive and negative electrodes. Thus, the coupling of the electrode assembly and the insulator to the case is facilitated.

In the power storage device, at least one of the collector and the insulator may include a positioning portion adapted to position the insulator and the collector relative to each other.

In this structure, the positioning portions position the insulator and the collector and limit their movements. This facilitates the coupling of the electrode assembly and the insulator to the case.

In the power storage device, the positioning portion may include a recess or a protrusion, which is included in the opposing surface, and an engagement protrusion or an engagement recess, which is located in the insulator and engageable with the projection or the recess.

In this structure, the positioning and integration of the collector and the insulator can be achieved just by engaging the recess or the protrusion with the engagement protrusion or the engagement recess.

In the power storage device, the positioning portion may include a hook-shaped engagement portion located in the insulator to be engageable with the collector.

In this structure, the positioning and integration of the collector and the insulator can be achieved just by engaging the engagement portion with the collector.

In the power storage device, the positioning portion may include the engagement portion and a cut out part formed in the collector to be engageable with the engagement portion.

In this structure, the contact between the cut out part and the engagement portion limits movement of the collector.

In the power storage device, the insulator may include a locking portion that locks the connection surface.

In this structure, the locking of the connection surface of the collector by the locking portion prevents movement of the insulator in the direction perpendicular to the stacking direction of the electrode assembly. This integrates the insulator and the collector and facilitates the coupling of the electrode assembly and the insulator to the case.

In the power storage device, the insulator may include a locking portion that locks the connection surface. The secondary insulation portions may be bent from the opposite sides of the primary insulation portion so that the locking portion locks the connection surface. The opposite sides of the primary insulation portion may each include a bending aid portion for a corresponding one of the secondary insulation portions.

In this structure, the locking of the connection surface by the locking portion is achieved by bending the secondary insulation portions. This eliminates the need for forcibly deforming the secondary insulation portions by pressing the secondary insulation portions over the collector like in the case of a U-shaped insulator. This reduces the stress applied to the secondary insulation portions. In addition, the bending aid portions facilitate the bending of the secondary insulation portions.

In the power storage device, an outer side of each secondary insulation portion may be in contact with an inner surface of the case.

In this structure, the inner surfaces of the case that face the secondary insulation portions prevent the secondary insulation portions from returning to the shape before bending. This maintains the locking of the connection surface by the locking portions.

In the power storage device, the power collection group may project from one surface of the electrode assembly. The power collection group may include a proximal end portion, a distal end portion, and a bent portion located between the proximal end portion and the distal end portion. The power collection group may be curved or bent at the bent portion so that a section of the power collection group from the bent portion to the distal end portion extends in a stacking direction of the positive electrodes and the negative electrodes.

In this structure, compared to a structure in which the entire power collection group extends perpendicular to the stacking direction of the electrode assembly, the space accommodating the power collection group in the case is reduced in the direction perpendicular to the stacking direction of the electrode assembly.

The power storage device may include a support that is located between the distal end portion of the collector and the electrode assembly and capable of supporting the distal end portion.

In this structure, even if the connection section between the distal end portion of the power collection group and the connection surface of the collector is close to the bent portion, the section of the distal end portion of the power collection group that is located at the distal side of the connection section does not fall toward the electrode assembly since the distal end portion of the power collection group is supported by the support. This prevents a situation in which the distal end portion of the power collection group falls toward the electrode assembly, contacts the case, and causes short-circuiting between the power collection group and the case.

The power storage device may be a rechargeable battery.

In this invention, useless space is reduced that makes no contribution to the performance of the rechargeable battery. Thus, compared to a conventional rechargeable battery, the overall power density of the rechargeable battery is increased. In addition, the insulator ensures the insulation between the collector and the case. This limits malfunctions of the rechargeable battery.

Effect of the Invention

The present invention allows reduction in useless space and allows insulation of a collector and a power collection group from a case.

BRIEF DESCRIPTION OF THE DRAWINGS

FIG. 2 is an exploded perspective view showing the rechargeable battery;

MODES FOR CARRYING OUT THE INVENTION

First Embodiment

Referring to FIGS. 1A to 7, a first embodiment of a rechargeable battery will now be described. The rechargeable battery is installed in a vehicle (e.g., an industrial vehicle and a passenger car) and used to drive a drive motor.

Figure 1A:
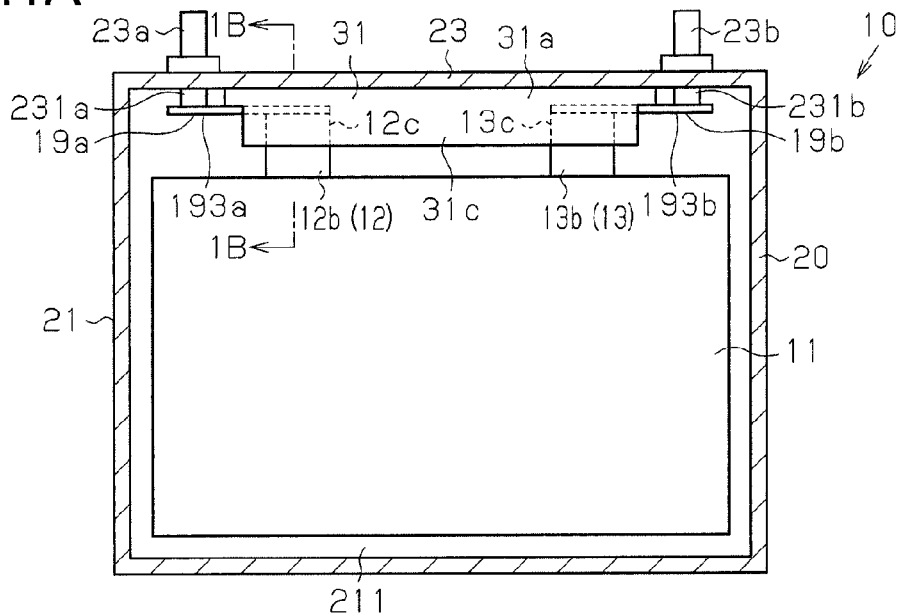
FIG. 1A is a cross-sectional view showing a first embodiment of a rechargeable battery.

As shown in FIG. 1A, a rechargeable battery 10 includes an electrode assembly 11 and an aluminum case 20 that accommodates the electrode assembly 11. As shown in FIG. 2, the case 20 includes a case body 21, which has the shape of a rectangular box with a bottom, and a lid 22, which has the shape of a rectangular plate. One side of the case body 21 includes an insertion portion 21a through with the electrode assembly 11 is insertable. The lid 22 closes the insertion portion 21a of the case body 21. The case 20 is filled with an electrolyte. Four side walls extend from the periphery of a bottom wall 211. A positive terminal 23a and a negative terminal 23b extend outward from a terminal wall 23 (wall of the case 20), which is one of the four side walls.

Figure 3:
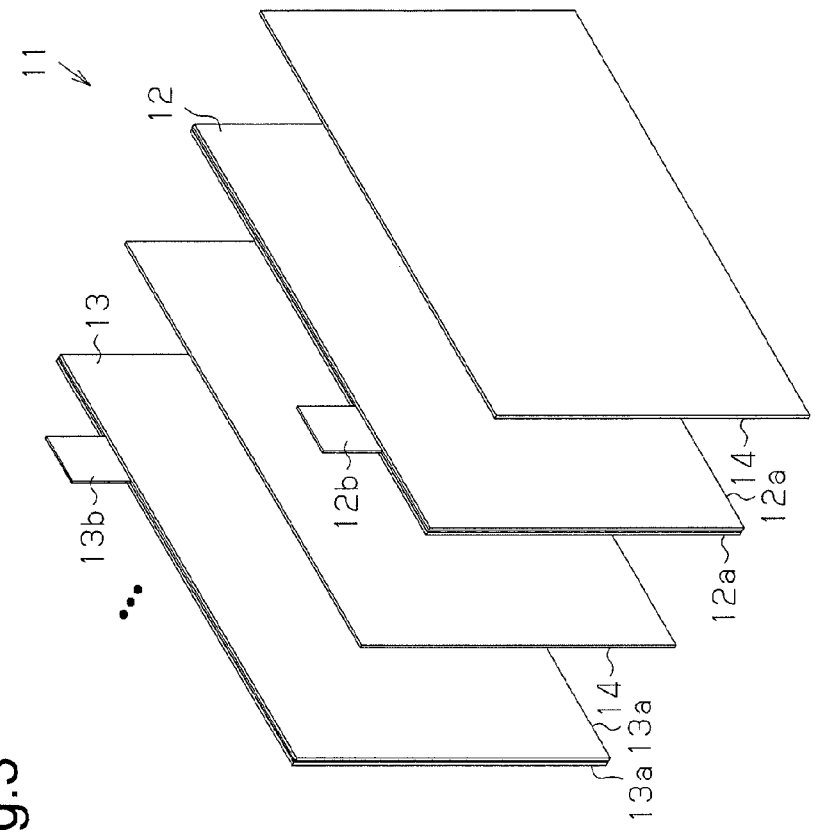
FIG. 3 is a perspective view showing a positive sheet, a negative sheet, and separators.
Figure 4:
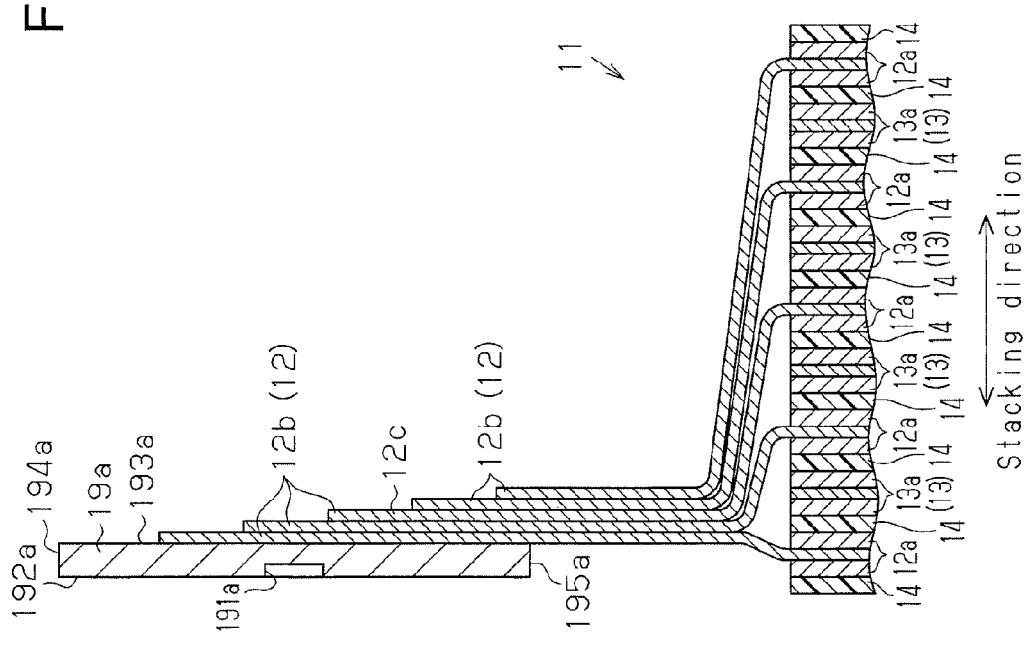
FIG. 4 is an enlarged cross-sectional view of a power collection group.

As shown in FIG. 3, the electrode assembly 11 includes positive sheets 12, which function as positive electrodes (positive electrode members), negative sheets 13, which function as negative electrodes (negative electrode members), and sheet-shaped separators 14. The positive sheets 12, the negative sheets 13, and the separators 14 are stacked together in one direction. The separators 14 are arranged between the positive sheets 12 and the negative sheets 13 to insulate the positive sheets 12 from the negative sheets 13. That is, the electrode assembly 11 of the present embodiment is a laminated electrode assembly in which the positive sheets 12, the negative sheets 13, and the separators 14, which are non-continuous, are stacked in one direction (stacking direction).

Each positive sheet 12 includes an active material layer 12a and a power collection portion 12b. The active material layer 12a is formed by applying an active material to a metal foil, which is made of aluminum and functions as a base. An active material is not applied to the power collection portion 12b. The power collection portion 12b extends from one end of the rectangular active material layer 12a to collect electricity from the positive sheet 12. Each negative sheet 13 includes an active material layer 13a and a power collection portion 13b. The active material layer 13a is formed by applying an active material to a metal foil, which is made of copper and functions as a base. An active material is not applied to the power collection portion 13b. The power collection portion 13b extends from one end of the rectangular active material layer 13a to collect electricity from the negative sheet 13. All positive sheets 12 have the same rectangular shape. The power collection portions 12b overlap with one another in the stacking direction of the electrode assembly 11. Similarly, all negative sheets 13 have the same rectangular shape, and the power collection portions 13b overlap with one another in the stacking direction of the electrode assembly 11. The power collection portions 12b do not overlap with the power collection portions 13b at one side of the electrode assembly 11.

All collection portions 12b are gathered in the stacking direction and form a positive power collection group 12c. The power collection group 12c extends from one side of the electrode assembly 11. One surface of the power collection group 12c is connected to a connection surface 193a of a positive collector 19a, which is a collector having the shape of a rectangular plate (a planar member extending in the stacking direction). The power collection group 12c and the positive collector 19a are joined through ultrasonic welding. When gathering the power collection portions 12b, the curvatures of the power collection portions 12b are adjusted to avoid contact between the power collection portions 12b and the power collection portions 13b of the negative sheets 13.

Figure 1B:
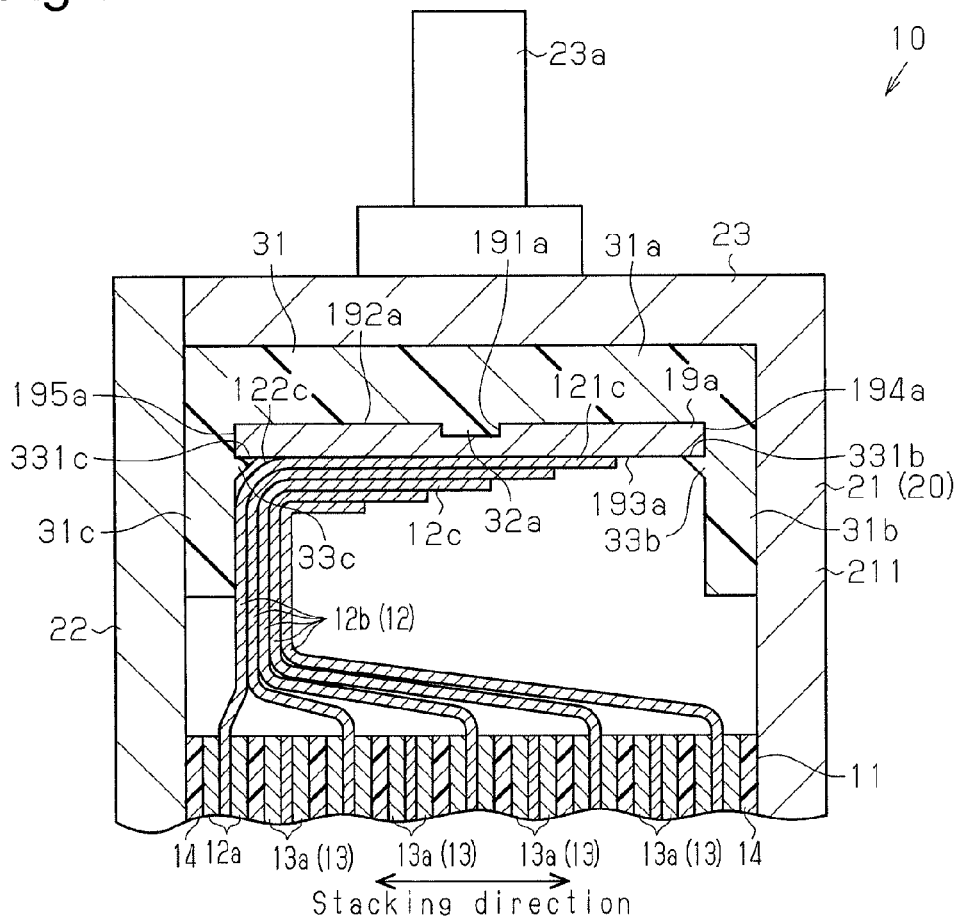
FIG. 1B is a cross-sectional view of the rechargeable battery of FIG. 1A taken along line 1B-1B in FIG. 1A.
Figure 5:
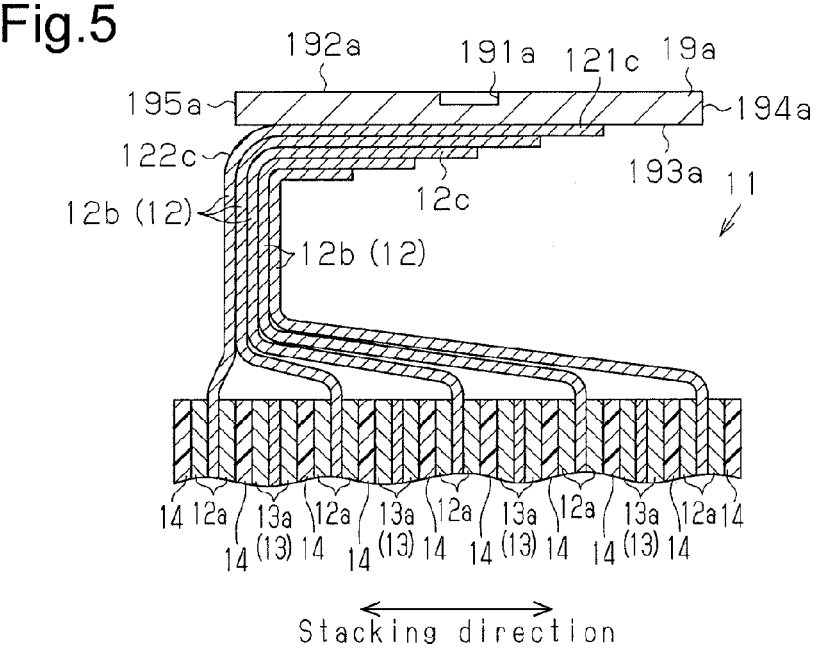
FIG. 5 is a cross-sectional view showing the bent collection group.

As shown in FIGS. 1B and 5, the power collection group 12c includes a proximal end portion, a distal end portion 121c, and a bent portion 122c, which is located between the proximal end portion and the distal end portion 121c. The power collection group 12c is bent at the bent portion 122c. The power collection group 12c is bent such that the section between the bent portion 122c and the distal end portion 121c extends in the stacking direction. The positive collector 19a extends in the stacking direction of the electrode assembly 11. The positive collector 19a includes an opposing surface 192a that is opposite to the connection surface 193a. The opposing surface 192a faces the terminal wall 23.

The description of the power collection portions 12b of the positive sheets 12 would be the same as the description of the power collection portions 13b of the negative sheets 13. Thus, the power collection portions 13b will not be described in detail. The description of the power collection portions 12b of the positive sheets 12 would be applicable to the power collection portions 13b of the negative sheets 13 by changing the positive sheet 12, the power collection portion 12b, the power collection group 12c, the positive collector 19a to the negative sheet 13, the power collection portion 13b, the power collection group 13c, and the negative collector 19b, respectively. As shown in FIG. 2, the power collection groups 12c of the positive sheets 12 and the power collection groups 13c of the negative sheets 13 extend in the same direction (one direction).

As shown in FIG. 1B, a U-shaped insulator 31 is arranged between the positive collector 19a and the case 20 and between the negative collector 19b and the case 20. The insulator 31 includes a primary insulation portion 31a, which has the shape of a rectangular plate and is arranged between the terminal wall 23 and both of the opposing surface 192a of the positive collector 19a and the opposing surface 192b of the negative collector 19b, and two secondary insulation portions 31b and 31c, which have the shape of a rectangular plate and extend from opposite long edges (opposite long sides) of the primary insulation portion 31a toward the electrode assembly 11.

As shown in FIG. 1A, the primary insulation portion 31a has a longitudinal length that is shorter than the distance between a projection 231a of the positive terminal 23a and a projection 231b of the negative terminal 23b. The projections 231a and 231b project in the case 20. In addition, as shown in FIG. 1B, the primary insulation portion 31a has a lateral length that is equal to the distance between the inner surface of the lid 22 and the inner surface of the bottom wall 211 of the case body 21 that faces the lid 22.

As shown in FIG. 1A, the secondary insulation portions 31b and 31c have a longitudinal length that is longer than the distance between the connection section between the power collection group 12c of the positive sheets 12 and the connection surface 193a of the positive collector 19a and the connection section between the power collection group 13c of the negative sheets 13 and the connection surface 193b of the negative collector 19b. The secondary insulation portions 31b and 31c continuously cover the connection sections.

Further, as shown in FIG. 1B, the length of the secondary insulation portions 31b and 31c in the direction in which the secondary insulation portions 31b and 31c extend from the long edges of the primary insulation portion 31a is set such that the distal ends of the secondary insulation portions 31b and 31c are closer to the electrode assembly 11 than the connection surface 193a of the positive collector 19a and the connection surface 193b of the negative collector 19b. Thus, the distal ends of the secondary insulation portions 31b and 31c are located between the power collection groups 12c and 13c and the case 20. Further, the secondary insulation portions 31b and 31c are located at opposite sides of the positive collector 19a and the negative collector 19b in the stacking direction of the electrode assembly 11.

As a result, in the present embodiment, the primary insulation portion 31a insulates the positive collector 19a and the negative collector 19b from the terminal wall 23. In addition, the secondary insulation portion 31b separates and insulates the bottom wall 211 of the case body 21 from ends (primary end portions) 194a and 194b in the stacking direction of the electrode assembly 11 of the positive collector 19a and the negative collector 19b and the power collection groups 12c and 13c. Furthermore, the secondary insulation portion 31c separates and insulates the lid 22 from the other ends (secondary end portions) 195a and 195b in the stacking direction of the electrode assembly 11 of the positive collector 19a and the negative collector 19b and the power collection groups 12c and 13c.

Figure 6:
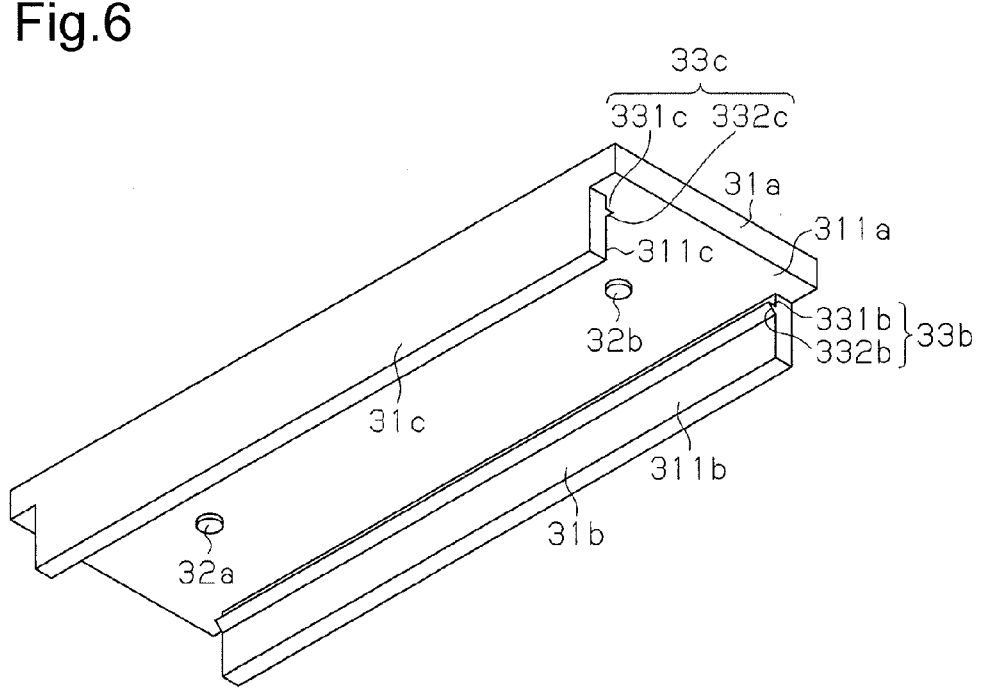
FIG. 6 is a perspective view showing an insulator from the back side.

As shown in FIGS. 2 and 5, the opposing surface 192a of the positive collector 19a includes a recess 191a, which functions as a positioning portion. The recess 191a is circular as viewed from above. The opposing surface 192b of the negative collector 19b includes a recess 191b, which functions as a positioning portion. The recess 191b is circular as viewed from above. The primary insulation portion 31a includes a back surface 311a that faces the opposing surface 192a of the positive collector 19a and the opposing surface 192b of the negative collector 19b. As shown in FIG. 6, the back surface 311a includes engagement protrusions 32a and 32b, which function as positioning portions. The engagement protrusions 32a and 32b are circular as viewed from above.

Figure 7:
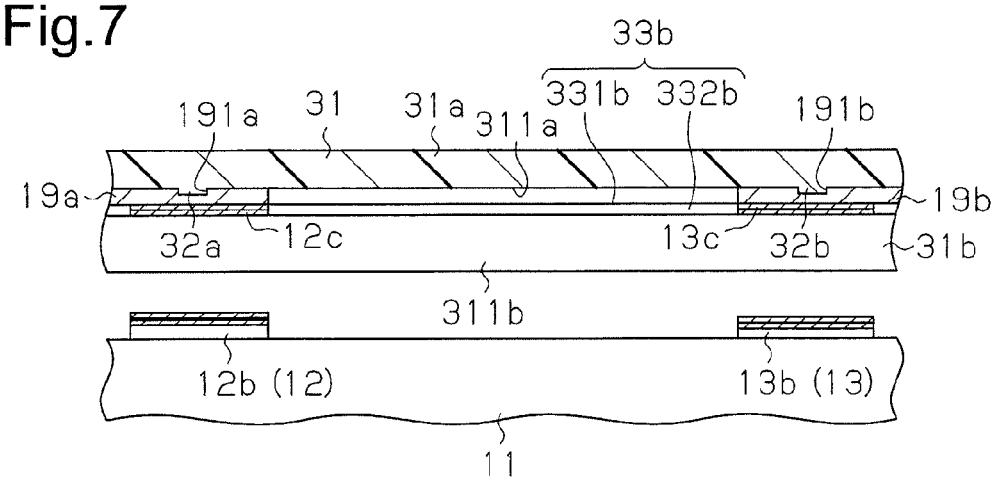
FIG. 7 is a partial cross-sectional view showing a positive collector, a negative collector, and a separator that are positioned relative to one another.

As shown in FIG. 7, the engagement protrusion 32a and the recess 191a of the positive collector 19a are engaged and coupled to each other. In addition, the engagement protrusion 32b and the recess 191b of the negative collector 19b are engaged and coupled to each other. These engagements position the insulator 31, the positive collector 19a, and the negative collector 19b. The insulator 31 integrates the positive collector 19a and the negative collector 19b. As a result, the insulator 31 positions the positive sheets 12 and the negative sheets 13 relative to one another.

Furthermore, as shown in FIG. 6, the secondary insulation portions 31b and 31c respectively include inner surfaces 311b and 311c that face each other. Locking portions 33b and 33c project from the inner surfaces 311b and 311c, respectively. The locking portions 33b and 33c respectively include locking surfaces 331b and 331c and inclined surfaces 332b and 332c. The locking surfaces 331b and 331c are perpendicular to the inner surfaces 311b and 311c of the secondary insulation portions 31b and 31c and extend straight toward each other. The inclined surface 332b extends straight from the distal end of the locking surface 331b to the inner surface 311b of the secondary insulation portion 31b and is inclined toward the distal end of the secondary insulation portion 31b. The inclined surface 332c extends straight from the distal end of the locking surface 331c to the inner surface 311c of the secondary insulation portion 31c and is inclined toward the distal end of the secondary insulation portion 31c. Thus, the locking portions 33b and 33c are triangular. The locking portions 33b and 33c extend over the entire longitudinal lengths of the secondary insulation portions 31b and 31c, respectively.

Referring to FIG. 1B, the positive collector 19a, the negative collector 19b, and the insulator 31 are integrated by pressing the insulator 31 onto the positive collector 19a and the negative collector 19b from the side corresponding to the opposing surface 192a of the positive collector 19a and the opposing surface 192b of the negative collector 19b. Here, the locking surfaces 331b and 331c lock the connection surface 193a of the positive collector 19a and the connection surface 193b of the negative collector 19b. This limits movement of the insulator 31 in the direction perpendicular to the stacking direction of the electrode assembly 11. In addition, the engagements between the recesses 191a and 191b of the collectors 19a and 19b and the engagement protrusions 32a and 32b of the insulator 31 limit movement of the insulator 31 in the longitudinal direction of the opposing surfaces 192a and 192b. This positions the positive collector 19a, the negative collector 19b, and the insulator 31.

The electrode assembly 11, in which the positive collector 19a, the negative collector 19b, and the insulator 31 are integrated, is inserted into the case body 21 through the insertion portion 21a of the case body 21. The positive collector 19a electrically connects the power collection group 12c of the positive sheets 12 to the positive terminal 23a, and the negative collector 19b electrically connects the power collection group 13c of the negative sheets 13 to the negative terminal 23b. Then, the lid 22 closes the insertion portion 21a of the case body 21 to form the rechargeable battery 10.

The operation of the first embodiment will now be described.

The positive collector 19a and the negative collector 19b are arranged such that the connection surfaces 193a and 193b of the positive collector 19a and the negative collector 19b face the electrode assembly 11. Thus, compared to the prior art, the space accommodating the power collection groups 12c and 13c in the case 20 is reduced in the direction perpendicular to the stacking direction of the electrode assembly 11. Further, even though the connection surfaces 193a and 193b of the collectors 19a and 19b face the electrode assembly 11, the insulator 31 insulates the case 20 from the positive collector 19a, the negative collector 19b, and the power collection groups 12c and 13c.

The first embodiment has the advantages described below.

(1) The positive collector 19a and the negative collector 19b are arranged such that the connection surfaces 193a and 193b face the electrode assembly 11. Thus, compared to the prior art, the space accommodating the power collection groups 12c and 13c is reduced in the direction perpendicular to the stacking direction of the electrode assembly 11. As a result, compared to the prior art, useless space is reduced that makes no contribution to the performance of the rechargeable battery 10. Thus, the case 20 can accommodate more portions that contribute to the performance of the rechargeable battery 10. This increases the overall power density of the rechargeable battery 10 and thus improves the travelling performance of the vehicle that uses the rechargeable battery 10. In addition, even though the collectors 19a and 19b are arranged as described above, the insulation is ensured by the insulator 31 that is arranged between the collectors 19a and 19b and the case 20.

(2) The engagement between the recesses 191a and 191b of the opposing surfaces 192a and 192b of the collectors 19a and 19b and the engagement protrusions 32a and 32b of the insulator 31 allows for the positioning of the positive collector 19a, the negative collector 19b, and the insulator 31. This limits movement of the insulator 31 in the longitudinal direction of the opposing surfaces 192a and 192b.

(3) The insulator 31, the positive collector 19a, and the negative collector 19b can be integrated by locking the positive collector 19a and the negative collector 19b with the locking portions 33b and 33c. This facilitates the coupling of the electrode assembly 11 and the insulator 31 to the case 20.

(4) The engagement between the recesses 191a and 191b of the collectors 19a and 19b and the engagement protrusions 32a and 32b of the insulator 31 allows the insulator 31 to integrate the positive collector 19a and the negative collector 19b. This maintains the positional relationship between the positive collector 19a and the negative collector 19b. As a result, an accurate positional relationship between the positive sheets 12 and the negative sheets 13 can be easily achieved.

(5) The positive collector 19a and the negative collector 19b can be positioned relative to the insulator 31 just by engaging the engagement protrusion 32a of the insulator 31 and the recess 191a of the positive collector 19a and engaging the engagement protrusion 32b and the recess 191b of the negative collector 19b.

(6) Each of the power collection groups 12c and 13c is bent such that the section between the bent portion 122c and the distal end portion 121c extends in the stacking direction of the electrode assembly 11. Compared to a structure in which the entire power collection groups 12c and 13c extend perpendicular to the stacking direction of the electrode assembly 11, the space accommodating the power collection groups 12c and 13c in the case 20 is reduced in the direction perpendicular to the stacking direction of the electrode assembly 11.

Second Embodiment

Referring to FIGS. 8A to 11, a second embodiment of a rechargeable battery will now be described. The rechargeable battery is installed in a vehicle (e.g., an industrial vehicle and a passenger car). In the second embodiment, same reference numerals are given to those components that are the same as the corresponding components of the first embodiment. Such components will not be described in detail.

Figure 8A:
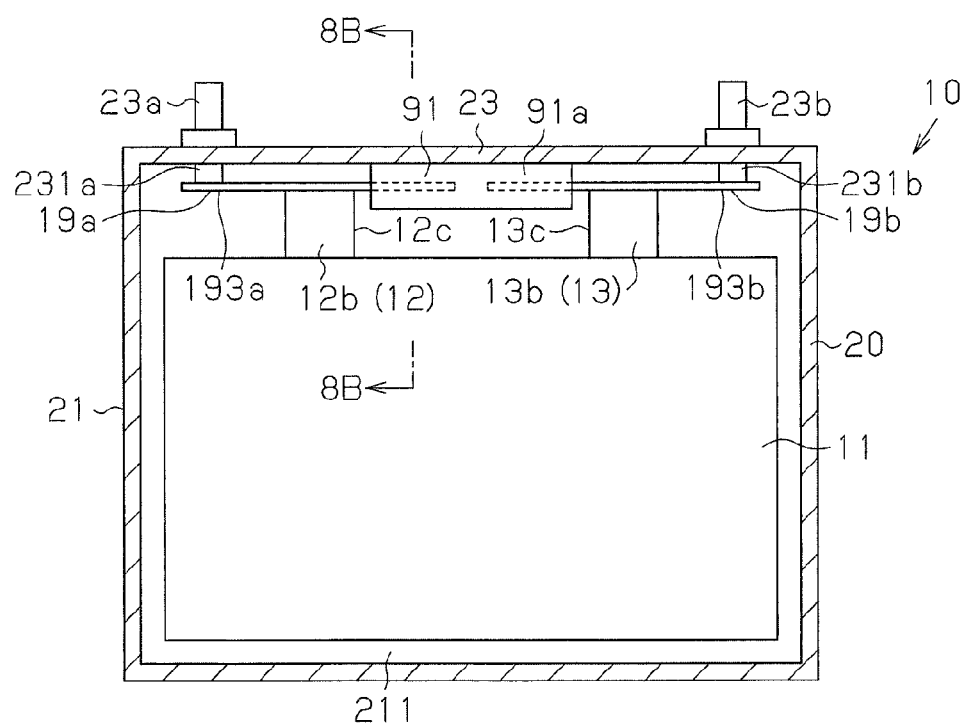
FIG. 8A is a cross-sectional view showing a second embodiment of a rechargeable battery.
Figure 8B:
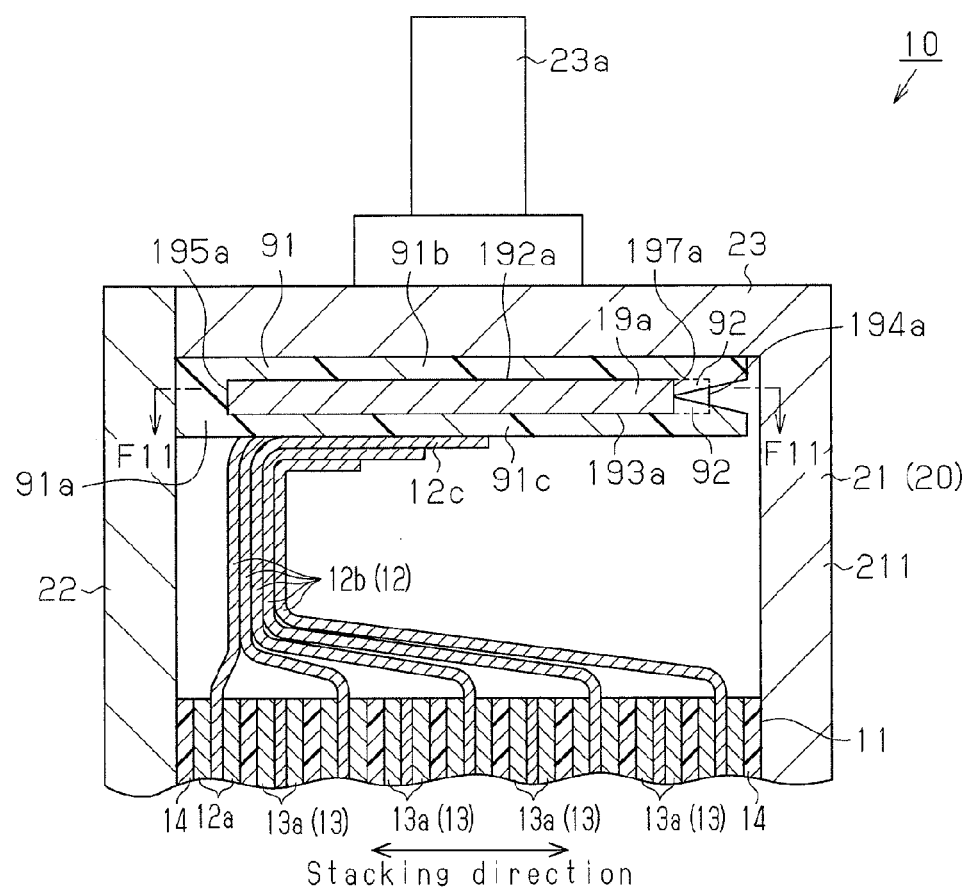
FIG. 8B is cross-sectional view of the rechargeable battery of FIG. 8A taken along line 8B-8B in FIG. 8A.

As shown in FIGS. 8A and 8B, a U-shaped insulator 91 is arranged between the positive collector 19a and the case 20 and between the negative collector 19b and the case 20. The insulator 91 includes a first insulation portion 91a, which has the shape of a rectangular plate. The first insulation portion 91a extends along the secondary end portions 195a and 195b of the positive collector 19a and the negative collector 19b. In addition, the insulator 91 includes a second insulation portion 91b, which has the shape of a rectangular plate. The second insulation portion 91b extends from one long edge (one long side) of the first insulation portion 91a along the opposing surfaces 192a and 192b of the positive collector 19a and the negative collector 19b. Furthermore, the insulator 91 includes a third insulation portion 91c, which has the shape of a rectangular plate. The third insulation portion 91c extends from the other long edge (the other long side) of the first insulation portion 91a along the connection surfaces 193a and 193b of the positive collector 19a and the negative collector 19b. The insulator 91 is arranged between the power collection group 12c of the positive sheets 12 and the power collection group 13c of the negative sheets 13.

Figure 9:
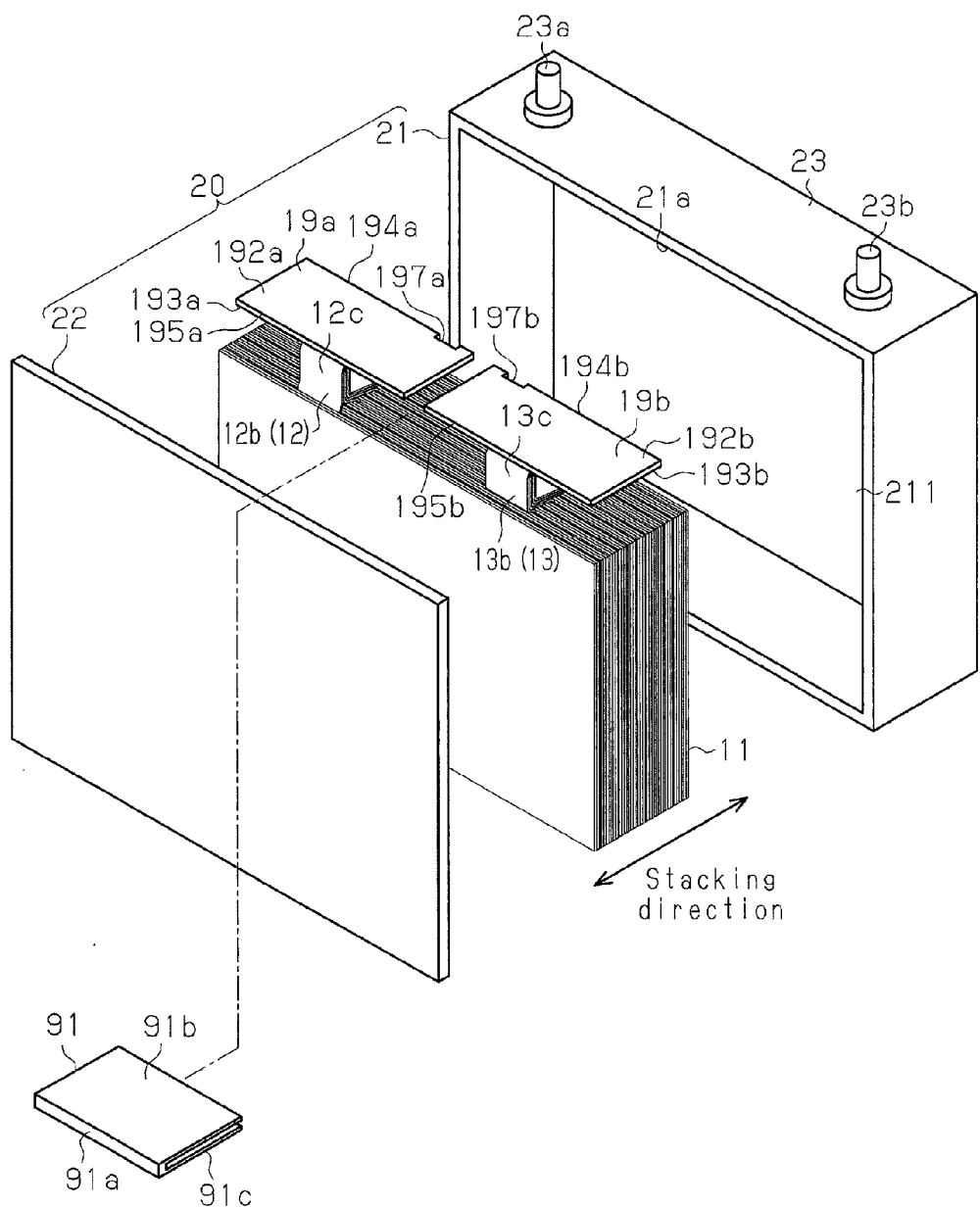
FIG. 9 is an exploded perspective view showing the rechargeable battery.

As shown in FIG. 9, the primary end portion 194a of the positive collector 19a includes a primary cut out part 197a, which functions as a positioning portion. The primary cut out part 197a is tetragonal as viewed from above. The primary cut out part 197a is located between the power collection group 12c of the positive sheets 12 and the power collection group 13c of the negative sheets 13. The primary end portion 194b of the negative collector 19b includes a secondary cut out part 197b, which functions as a positioning portion. The secondary cut out part 197b is tetragonal as viewed from above. The secondary cut out part 197b is located between the power collection group 12c of the positive sheets 12 and the power collection group 13c of the negative sheets 13.

Figure 10:
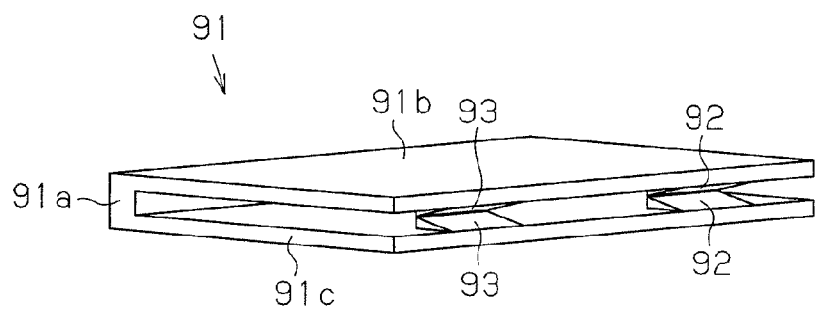
FIG. 10 is a perspective view showing an insulator.

As shown in FIG. 10, the distal end of the second insulation portion 91b, which is opposite to the first insulation portion 91a, and the distal end of the third insulation portion 91c, which is opposite to the first insulation portion 91a, each include a hook-shaped primary engagement portion 92. The primary engagement portions 92 face each other and protrude from the second insulation portion 91b and the third insulation portion 91c toward each other. Further, the distal end of the second insulation portion 91b, which is opposite to the first insulation portion 91a, and the distal end of the third insulation portion 91c, which is opposite to the first insulation portion 91a, each include a hook-shaped secondary engagement portion 93. The secondary engagement portions 93 face each other and protrude from the second insulation portion 91b and the third insulation portion 91c toward each other.

Figure 11:
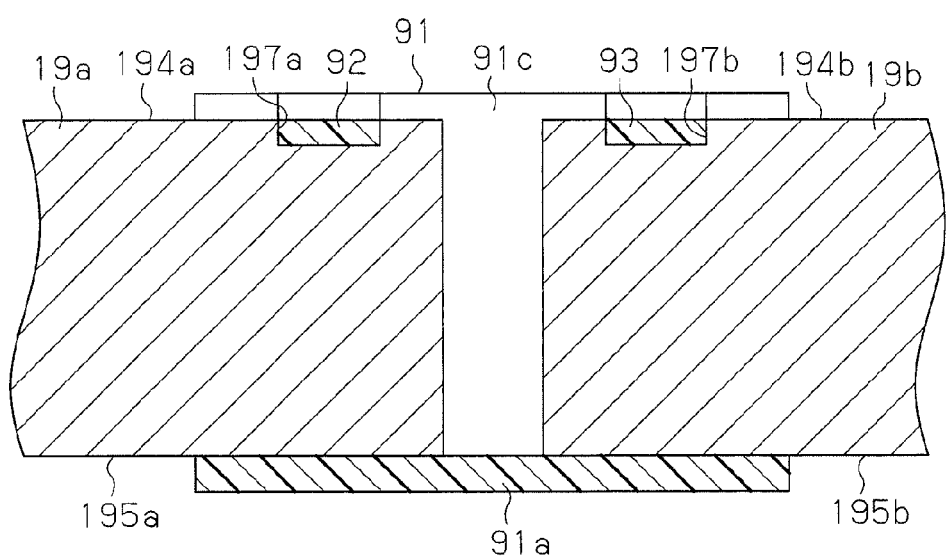
FIG. 11 is a cross-sectional view taken along line F11-F11 in FIG. 8B.

As shown in FIG. 11, the insulator 91 is coupled to the positive collector 19a and the negative collector 19b such that the primary engagement portions 92 are arranged in the primary cut out part 197a, and the secondary engagement portions 93 are arranged in the secondary cut out part 197b. This positions the first insulation portion 91a along the secondary end portion 195a of the positive collector 19a and the secondary end portion 195b of the negative collector 19b. In addition, the second insulation portion 91b is positioned along the opposing surface 192a of the positive collector 19a and the opposing surface 192b of the negative collector 19b, and the third insulation portion 91c is positioned along the connection surface 193a of the positive collector 19a and the connection surface 193b of the negative collector 19b. Thus, the positive collector 19a and the negative collector 19b are arranged between the second insulation portion 91b and the third insulation portion 91c.

The operation of the second embodiment will now be described.

If the insulator 91 were not coupled to the positive collector 19a and the negative collector 19b, the positional relationship between the positive collector 19a and the negative collector 19b would not be ensured. Thus, the positional relationship between the positive sheets 12 and the negative sheets 13 would change when moving the electrode assembly 11 to the case body 21 or placing the electrode assembly 11 in the case body 21, for example.

However, in the present embodiment, the insulator 91 is coupled to the positive collector 19a and the negative collector 19b. The contact between the first insulation portion 91a and the secondary end portions 195a and 195b of the collectors 19a and 19b, the contact (engagement) between the primary engagement portions 92 and the primary cut out part 197a, and the contact (engagement) between the secondary engagement portions 93 and the secondary cut out part 197b limit movement of the collectors 19a and 19b in the stacking direction of the electrode assembly 11 and in the longitudinal direction of the primary and secondary end portions 194a and 195a. Furthermore, the contact between the second insulation portion 91b and the opposing surfaces 192a and 192b of the collectors 19a and 19b and the contact between the third insulation portion 91c and the connection surfaces 193a and 193b of the collectors 19a and 19b limit movement of the collectors 19a and 19b in the direction perpendicular to the stacking direction of the electrode assembly 11.

The insulator 91 maintains the positional relationship between the positive collector 19a and the negative collector 19b. As a result, when moving the electrode assembly 11 to the case body 21 and when placing the electrode assembly 11 in the case body 21, the positional relationship between the positive collector 19a and the negative collector 19b is maintained. This limits changes in the positional relationship between the positive sheets 12 and the negative sheets 13.

The second embodiment has the following advantages in addition to advantages (1) and (6) of the first embodiment.

(7) The insulator 91 can couple the positive collector 19a and the negative collector 19b just by engaging the primary engagement portions 92 and the primary cut out part 197a and engaging the secondary engagement portions 93 and the secondary cut out part 197b.

(8) The primary engagement portions 92 are arranged in the primary cut out part 197a, and the secondary engagement portions 93 are arranged in the secondary cut out part 197b. Thus, the contact between the primary cut out part 197a and the primary engagement portions 92 and the contact between the secondary cut out part 197b and the secondary engagement portions 93 limit movement of the positive collector 19a and the negative collector 19b in the longitudinal direction of the primary and secondary end portions 194a and 195a. This further ensures the positional relationship between the positive collector 19a and the negative collector 19b.

The above embodiments may be modified as described below.

Figure 12A:
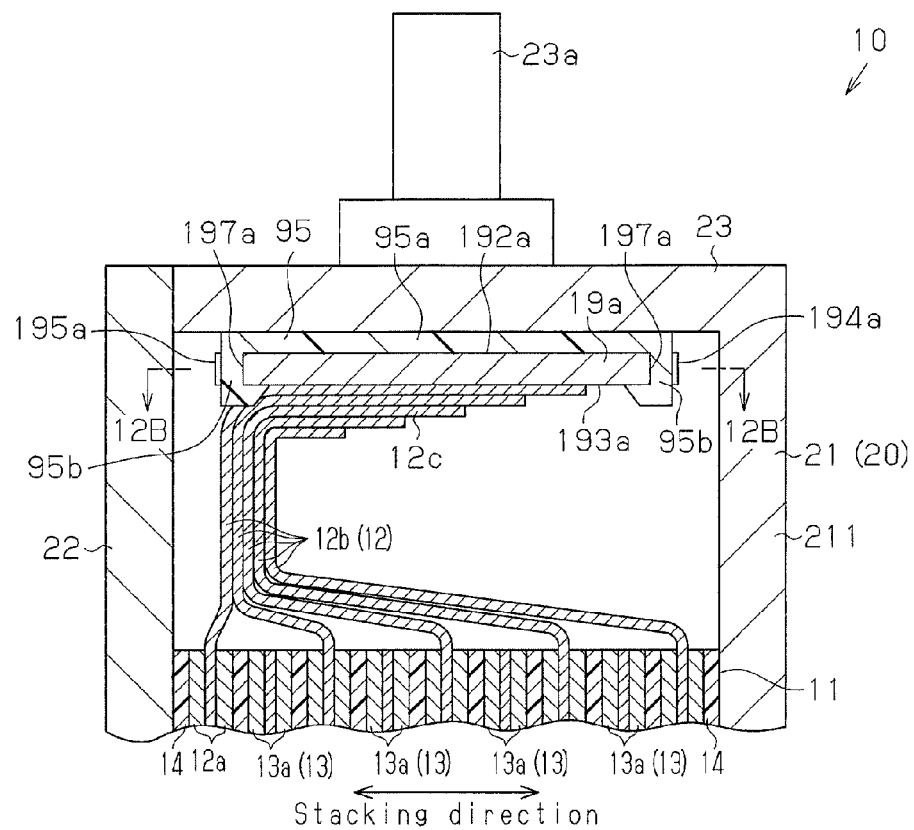
FIG. 12A is a partial cross-sectional view showing a rechargeable battery of another embodiment.
Figure 12B:
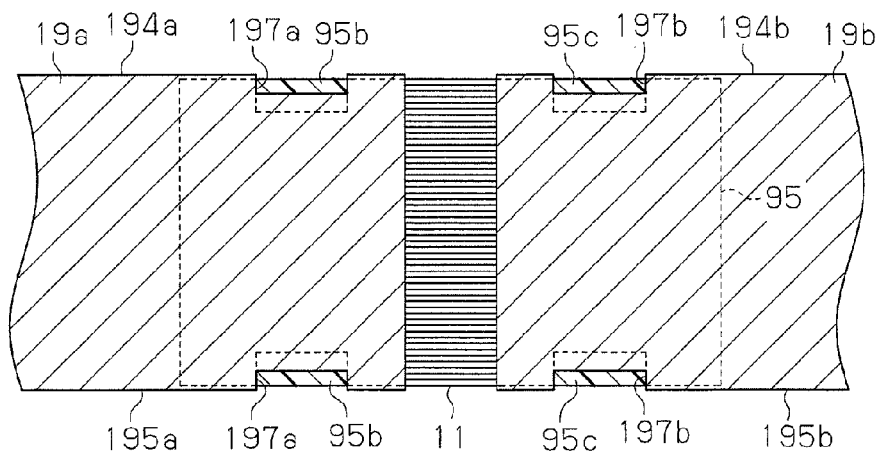
FIG. 12B is a cross-sectional view of the rechargeable battery of FIG. 12A taken along line 12B-12B in FIG. 12A.

Referring to FIGS. 12A and 12B, each of the primary and secondary end portions 194a and 195a of the positive collector 19a may include a primary cut out part 197a, which functions as a positioning portion. The primary cut out parts 197a are tetragonal as viewed from above. In addition, each of the primary and secondary end portions 194b and 195b of the negative collector 19b may include a secondary cut out part 197b, which functions as a positioning portion. The secondary cut out parts 197b are tetragonal as viewed from above. An insulator 95 may be arranged between the positive collector 19a and the case 20 and between the negative collector 19b and the case 20.

The insulator 95 includes a body portion 95a, which has the shape of a rectangular plate. The body portion 95a insulates the opposing surfaces 192a and 192b of the collectors 19a and 19b from the terminal wall 23. Primary engagement portions 95b extend from opposite long edges (long sides) of the body portion 95a toward the electrode assembly 11. The primary engagement portions 95b engage the primary cut out parts 197a. Each primary engagement portion 95b has a hook-shaped distal end and engages the connection surface 193a of the positive collector 19a. Further, secondary engagement portions 95c extend from opposite long edges (long sides) of the body portion 95a toward the electrode assembly 11. The secondary engagement portions 95c engage the secondary cut out parts 197b. Each secondary engagement portion 95c has a hook-shaped distal end and engages the connection surface 193b of the negative collector 19b.

The insulator 95 is coupled to the positive collector 19a and the negative collector 19b such that the primary engagement portions 95b engage the primary cut out parts 197a, and the secondary engagement portions 95c engage the secondary cut out parts 197b. This positions the positive collector 19a and the negative collector 19b between the body portion 95a and the distal ends of the primary and secondary engagement portions 95b and 95c.

The integration of the positive collector 19a and the negative collector 19b by the insulator 95 limits movement of the positive collector 19a and the negative collector 19b in the stacking direction of the electrode assembly 11 and in the longitudinal direction of the primary and secondary end portions 194a and 195a. Moreover, the contact between the body portion 95a and the opposing surfaces 192a and 192b of the collectors 19a and 19b and the contact between the distal ends of the primary engagement portions 95b and the connection surfaces 193a and 193b of the collectors 19a and 19b limit movement of the positive collector 19a and the negative collector 19b in the direction perpendicular to the stacking direction of the electrode assembly 11.

Figure 13A:
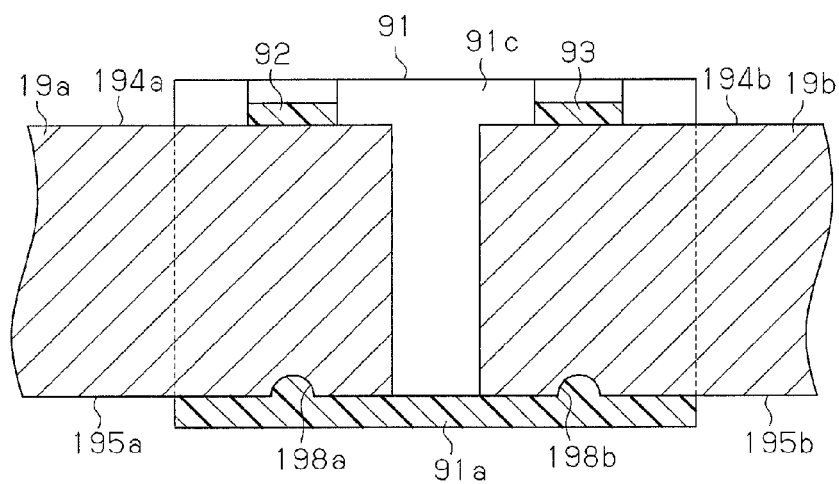
FIG. 13A is a partial cross-sectional view showing a further embodiment in which an insulator positions a positive collector and a negative collector relative to each other.
Figure 13B:
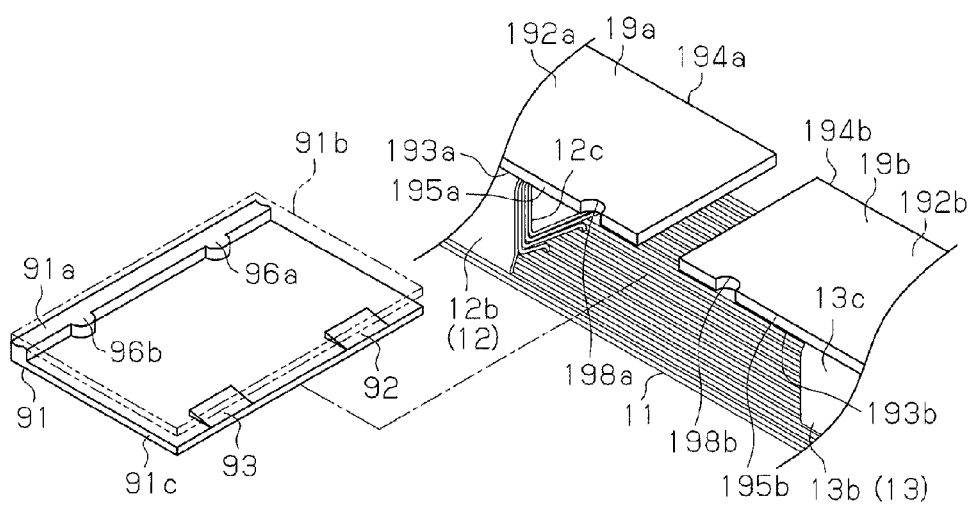
FIG. 13B is a perspective view showing a structure including the positive and negative collectors.

As shown in FIGS. 13A and 13B, in the second embodiment, the primary cut out part 197a and the secondary cut out part 197b may be omitted, the secondary end portion 195a of the positive collector 19a may include a first cut out part 198a, and the secondary end portions 195b of the negative collector 19b may include a second cut out part 198b. The first and second cut out parts 198a and 198b are semicircular as viewed from above. The first cut out part 198a and the second cut out part 198b extend through the respective positive collector 19a and the negative collector 19b in the thickness direction. The inner surface of the first insulation portion 91a of the insulator 91 includes a first engagement portion 96a and a second engagement portion 96b, which function as positioning portions. The first engagement portion 96a engages the first cut out part 198a, and the second engagement portion 96b engages the second cut out part 198b. The first and second engagement portions 96a and 96b have the shape of a semicircular column extending between the second insulation portion 91b and the third insulation portion 91c. When the insulator 91 is coupled to the positive collector 19a and the negative collector 19b, the first cut out part 198a engages the first engagement portion 96a, and the second cut out part 198b engages the second engagement portion 96b. The positioning and integration of the positive collector 19a and the negative collector 19b may be achieved by the insulator 91 as described above.

In the embodiment shown in FIGS. 13A and 13B, the primary engagement portions 92 described in the second embodiment engage the primary end portion 194a of the positive collector 19a. In addition, in the embodiment shown in FIGS. 13A and 13B, the secondary engagement portions 93 described in the second embodiment engage the primary end portion 194b of the negative collector 19b.

Figure 14:
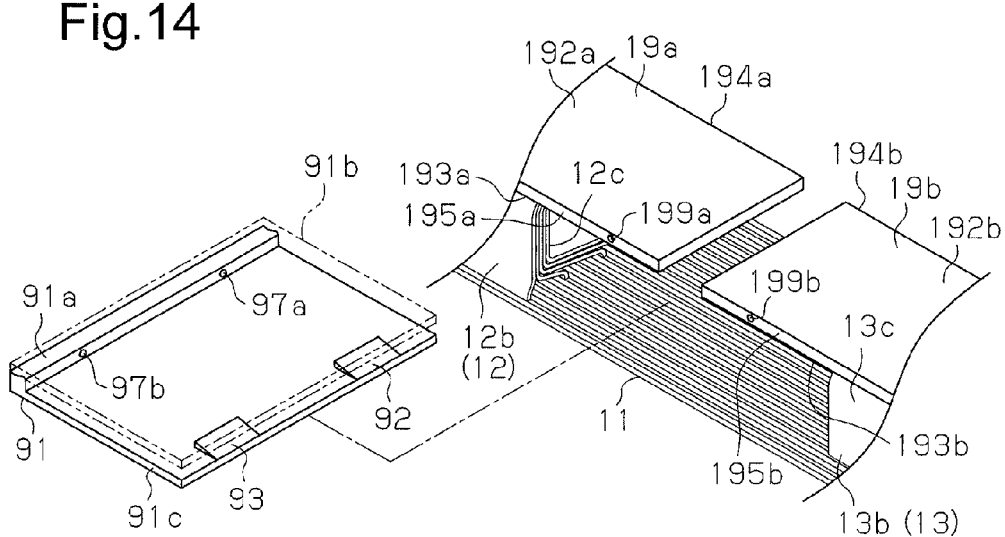
FIG. 14 is a perspective view showing a structure including a positive collector and a negative collector in a further embodiment.

As shown in FIG. 14, in the second embodiment, the primary cut out part 197a and the secondary cut out part 197b may be omitted, and the secondary end portion 195a of the positive collector 19a and the secondary end portion 195b of the negative collector 19b may include recesses 199a and 199b, respectively, which function as positioning portions. The inner surface of the first insulation portion 91a of the insulator 91 includes engagement protrusions 97a and 97b, which function as positioning portions. The engagement protrusions 97a and 97b engage the recesses 199a and 199b, respectively. When the insulator 91 is coupled to the positive collector 19a and the negative collector 19b, the engagement protrusion 97a engages the recess 199a of the positive collector 19a, and the engagement protrusion 97b engages the recess 199b of the negative collector 19b. The positioning and integration of the positive collector 19a and the negative collector 19b may be achieved by the insulator 91 as described above. In the embodiment shown in FIG. 14, the primary engagement portions 92 described in the second embodiment engage the primary end portion 194a of the positive collector 19a. In addition, in the embodiment shown in FIG. 14, the secondary engagement portions 93 described in the second embodiment engage the primary end portion 194b of the negative collector 19b.

Figure 15:
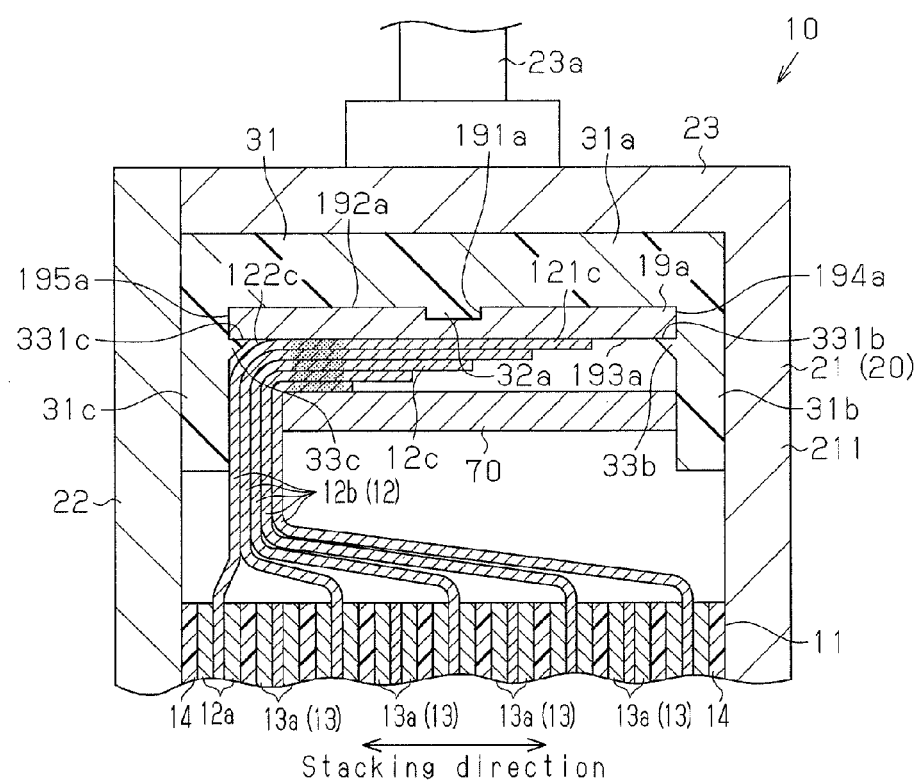
FIG. 15 is a partial cross-sectional view showing a rechargeable battery of a further embodiment.

As shown in FIG. 15, in the first embodiment, a planar support 70 may be arranged between the power collection group 12c and the electrode assembly 11. The support 70 can support the distal end portion 121c of the power collection group 12c. The support 70 is joined with a section of the power collection group 12c that is closer to the electrode assembly 11 than the bent portion 122c. The support 70 extends straight between the bent portion 122c of the power collection group 12c and the secondary insulation portion 31b of the insulator 31. The support 70 is connected to the power collection group 12c by soldering a section of the power collection group 12c near the bent portion 122c. At the same time as when the support 70 and the power collection group 12c are connected, the power collection group 12c is connected to the connection surface 193a of the positive collector 19a. The distal end portion of the power collection group 12c is located between the positive collector 19a and the support 70, and the support 70 can support the distal end portion of the power collection group 12c. This prevents contact between the distal end portion of the power collection group 12c and the case 20 and prevents short-circuiting between the power collection group 12c and the case 20.

Figure 16:
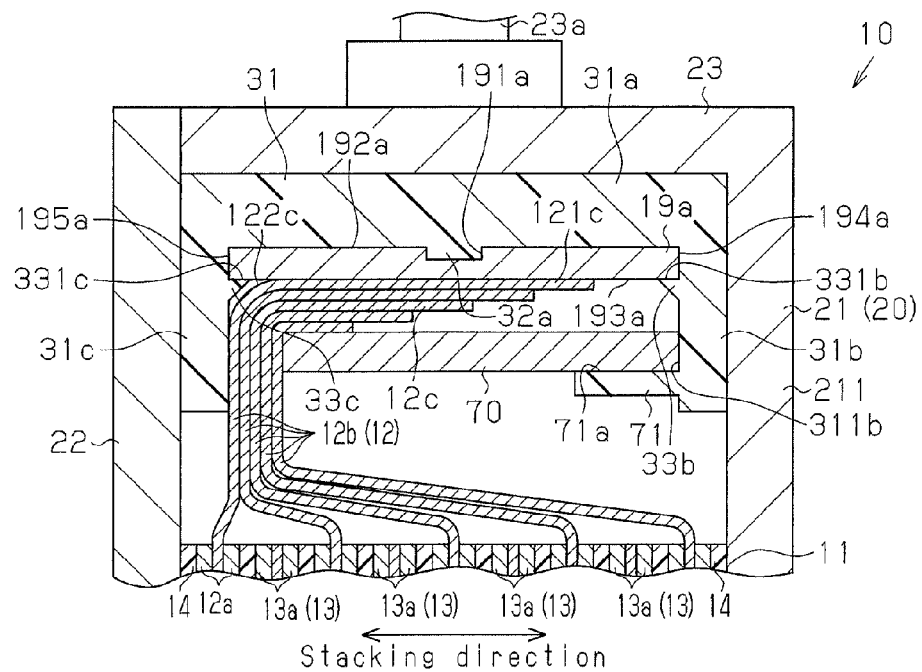
FIG. 16 is a partial cross-sectional view showing a rechargeable battery of a further embodiment.

Further, as shown in FIG. 16, the support 70 may be supported by a support portion 71 formed in the insulator 31. The support portion 71 projects from the inner surface 311b of the secondary insulation portion 31b of the insulator 31. The support portion 71 includes a flat upper surface 71a that faces the primary insulation portion 31a of the insulator 31.

The upper surface 71a functions as a mount surface that receives the support 70. As for the structures of FIGS. 15 and 16, only the power collection group 12c of the positive sheets 12 is described. Since the power collection group 13c of the negative sheets 13 is formed in the same manner, the power collection group 13c of the negative sheets 13 will not be described in detail.

Figure 17A:
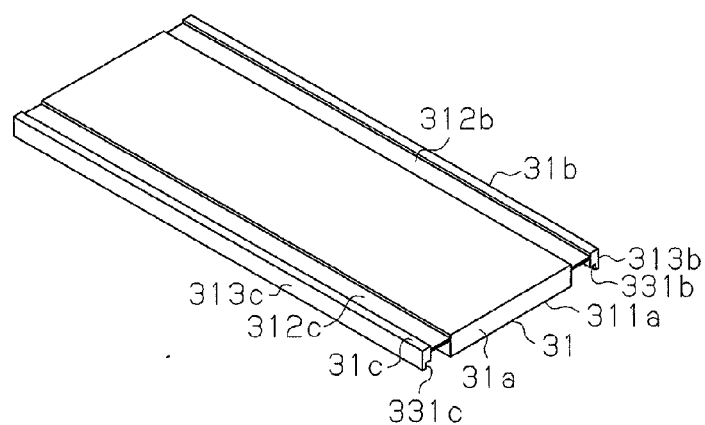
FIG. 17A is a perspective view showing an insulator in a further embodiment before being U-shaped.
Figure 17B:
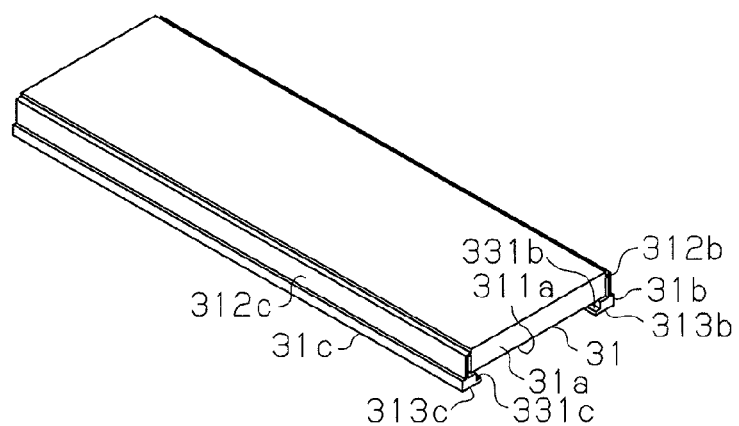
FIG. 17B is a perspective view showing the U-shaped insulator.

Referring to FIGS. 17A and 17B, the U-shaped insulator 31 may be formed by bending the secondary insulation portions 31b and 31c from the opposite long edges (long sides) of the primary insulation portion 31a toward the electrode assembly 11.

As shown in FIG. 17A, the insulator 31 is rectangular before the secondary insulation portions 31b and 31c are bent. The secondary insulation portion 31b includes a thin portion 312b and an L-shaped locking portion 313b. The secondary insulation portion 31c includes a thin portion 312c and an L-shaped locking portion 313c. The thin portions 312b and 312c extend from the opposite long edges of the primary insulation portion 31a. The thin portions 312b and 312c are thinner than the primary insulation portion 31a and function as bending aid portions. The locking portions 313b and 313c are located at the distal sides of the respective thin portions 312b and 312c. The locking portions 313b and 313c include locking surfaces 331b and 331c, respectively, which face the back surface 311a of the primary insulation portion 31a when the thin portions 312b and 312c of the secondary insulation portions 31b and 31c are bent.

Figure 18:
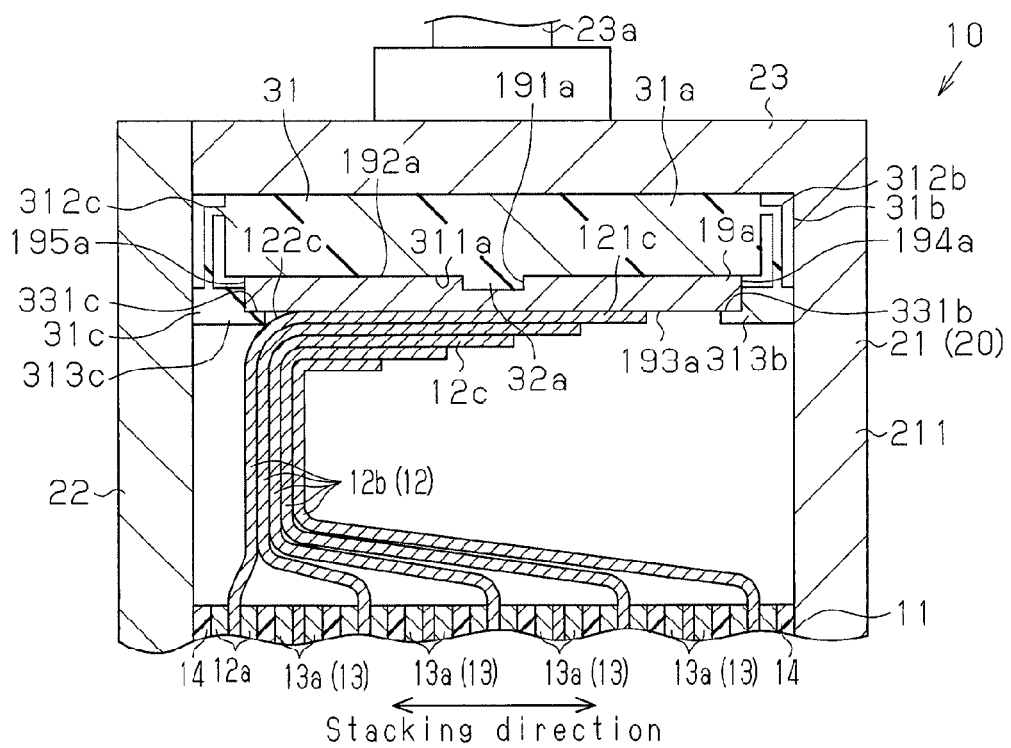
FIG. 18 is a partial cross-sectional view of a rechargeable battery of a further embodiment.

As shown in FIG. 18, the insulator 31 is integrated with the positive collector 19a and the negative collector 19b by bending the secondary insulation portions 31b and 31c at the thin portions 312b and 312c and by locking the connection surface 193a of the positive collector 19a and the connection surface 193b of the negative collector 19b with the locking surfaces 331b and 331c. When the electrode assembly 11, in which the positive collector 19a, the negative collector 19b, and the insulator 31 are integrated, is placed in the case body 21, the outer surface of the secondary insulation portion 31b contacts the inner surface of the bottom wall 211, which is the inner surface of the case 20, and the outer surface of the secondary insulation portion 31c contacts the inner surface of the lid 22, which is the inner surface of the case 20.

Figure 19A:
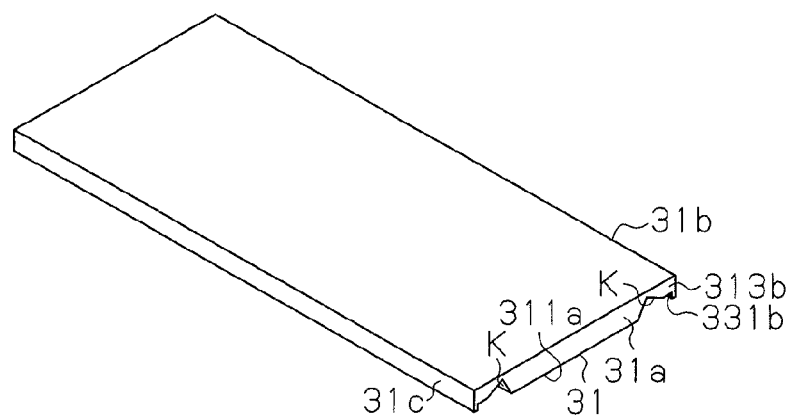
FIG. 19A is perspective view showing an insulator of a further embodiment before being U-shaped.
Figure 19B:
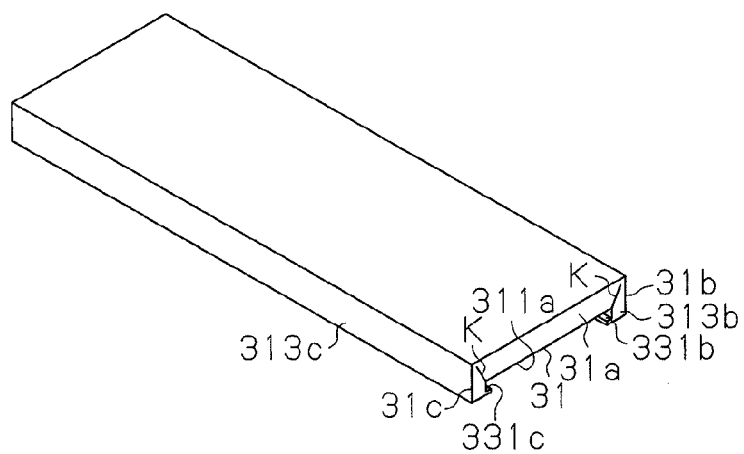
FIG. 19B is a perspective view showing the U-shaped insulator.
Figure 20:
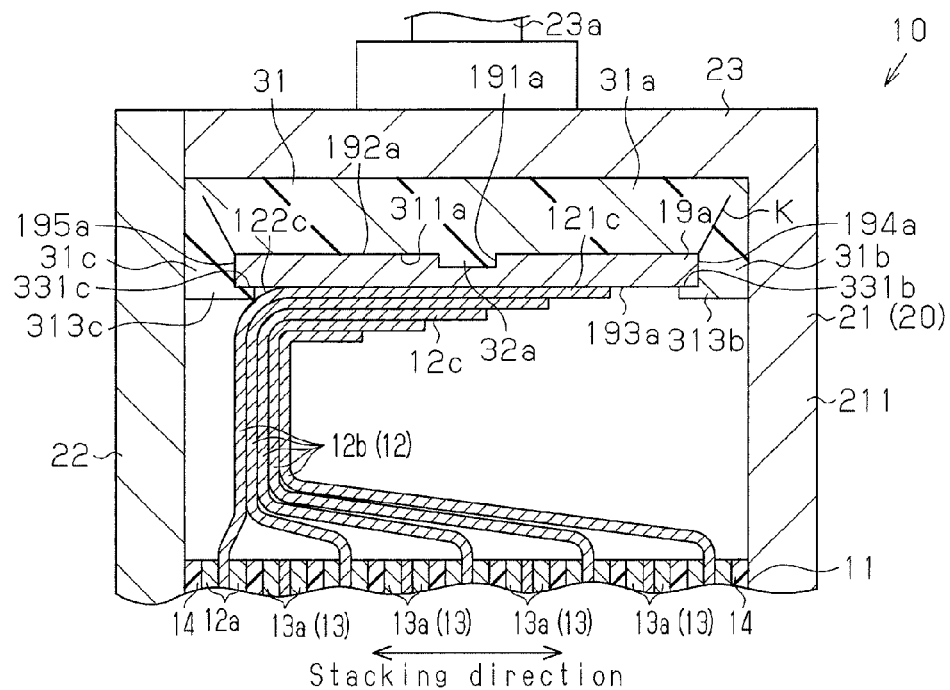
FIG. 20 is a partial cross-sectional view of a rechargeable battery of a further embodiment.

As shown in FIG. 19A, instead of the thin portions 312b and 312a, the insulator 31 may include notches K, which function as bending aid portions. Each notch K has a rectangular cross-section. As shown in FIGS. 19B and 20, the insulator 31 is integrated with the positive collector 19a and the negative collector 19b by bending the secondary insulation portions 31b and 31c so that the opposing inner surfaces of each notch K are in contact with each other, and the locking portions 313b and 313c engage the connection surfaces 193a and 193b of the collectors 19a and 19b.

When the electrode assembly 11, in which the positive collector 19a, the negative collector 19b, and the insulator 31 are integrated, is placed in the case body 21, the outer surface of the secondary insulation portion 31b contacts the inner surface of the bottom wall 211, which is an inner surface of the case 20, and the outer surface of the secondary insulation portion 31c contacts the inner surface of the lid 22, which is an inner surface of the case 20.

In the insulator 31, the secondary insulation portions 31b and 31c are bent at the thin portions 312b and 312c or the notches K to engage the locking portions 313b and 313c with the connection surfaces 193a and 193b. This eliminates the need for forcibly deforming the secondary insulation portions 31b and 31c by pressing the secondary insulation portions 31b and 31c over the collectors 19a and 19b when engaging the locking portions 313b and 313c with the connection surfaces 193a and 193b. This reduces the stress applied to the secondary insulation portions 31b and 31c.

In addition, the bottom wall 211 and the lid 22, which are located at the outer sides of the bent secondary insulation portions 31b and 31c prevent the secondary insulation portions 31b and 31c from returning to their original shapes. This maintains the engagement of the locking portions 313b and 313c with the connection surfaces 193a and 193b of the collectors 19a and 19b. Moreover, the thin portions 312b and 312c and the notches K facilitate bending of the secondary insulation portions 31b and 31c.

Figure 21:
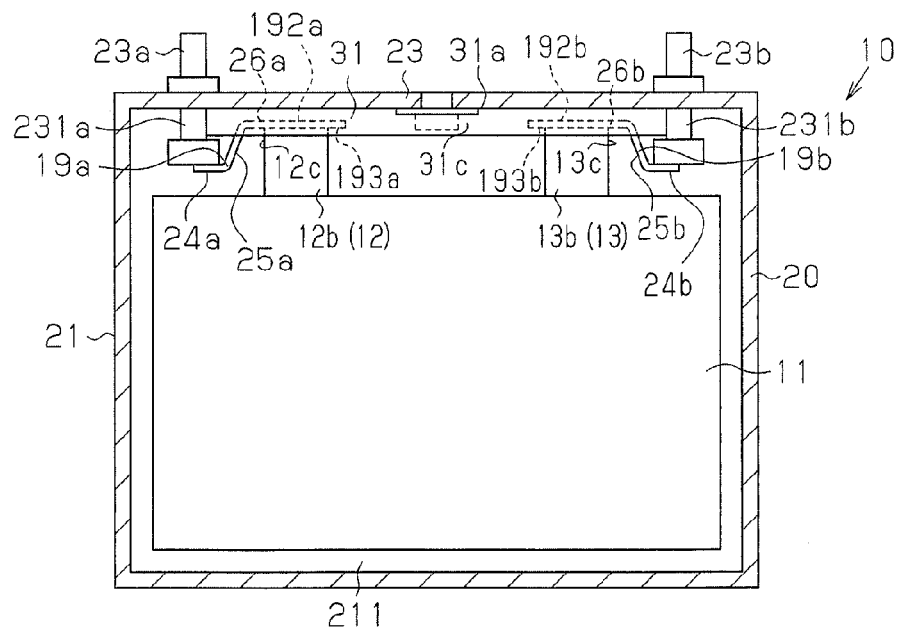
FIG. 21 is a longitudinal cross-sectional view of a rechargeable battery of a further embodiment.

As shown in FIG. 21, the positive collector 19a and the negative collector 19b may include planar terminal connection portions 24a and 24b, which are connected to the positive terminal 23a and the negative terminal 23b, respectively. In addition, the positive collector 19a may include a rising portion 25a, which rises from the terminal connection portion 24a, and a planar collection portion connecting portions 26a, which extends from the rising portion 25a. The negative collector 19b may include a rising portion 25b, which rises from the terminal connection portion 24b, and a planar collection portion connecting portions 26b, which extends from the rising portion 25b. Thus, the positive collector 19a and the negative collector 19b have the shape of a crank. In the positive collector 19a and the negative collector 19b, the power collection portion connecting portions 26a and 26b, which are located between the terminal connection portions 24a and 24b and the terminal wall 23, are connected to the power collection portions 12b and 13b, respectively.

Figure 22:
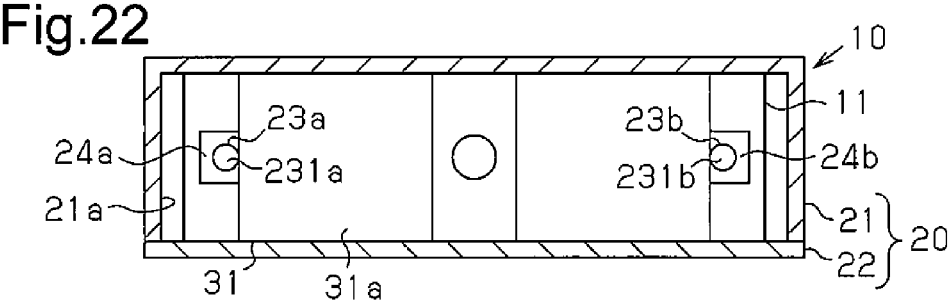
FIG. 22 is a cross-sectional view showing an insulator in a rechargeable battery of a further embodiment.

As shown in FIG. 22, the primary insulation portion 31a of the insulator 31 has a longitudinal length that allows the primary insulation portion 31a to contact the projection 231a of the positive terminal 23a and the projection 231b of the negative terminal 23b. The projections 231a and 231b project in the case 20.

In such a structure, the positive and negative terminals 23a and 23b extend through the terminal wall 23. This limits movement of the positive and negative terminals 23a and 23b relative to the terminal wall 23. Further, the positive collector 19a is connected to the positive terminal 23a, and the negative collector 19b is connected to the negative terminal 23b. This limits movement of the positive collector 19a and the negative collector 19b.

One end of the insulator 31 is in contact with the projection 231a of the positive terminal 23a. The other end of the insulator 31 is in contact with the projection 231b of the negative terminal 23b. This limits movement of the insulator 31 in the longitudinal direction toward the positive terminal 23a or the negative terminal 23b and facilitates the coupling of the electrode assembly 11 and the insulator 31 to the case 20.

Figure 23:
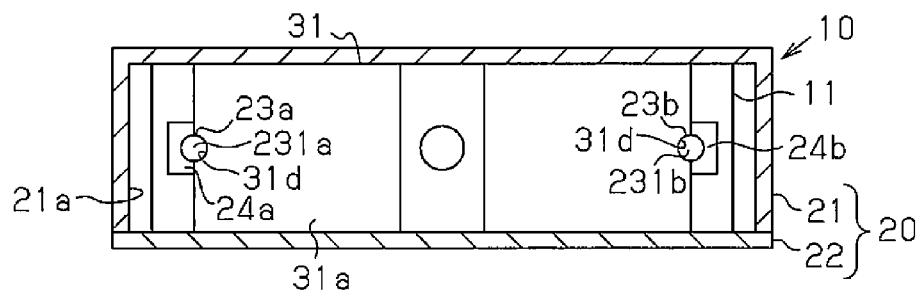
FIG. 23 is a cross-sectional view showing an insulator in a rechargeable battery of a further embodiment.
Figure 24:
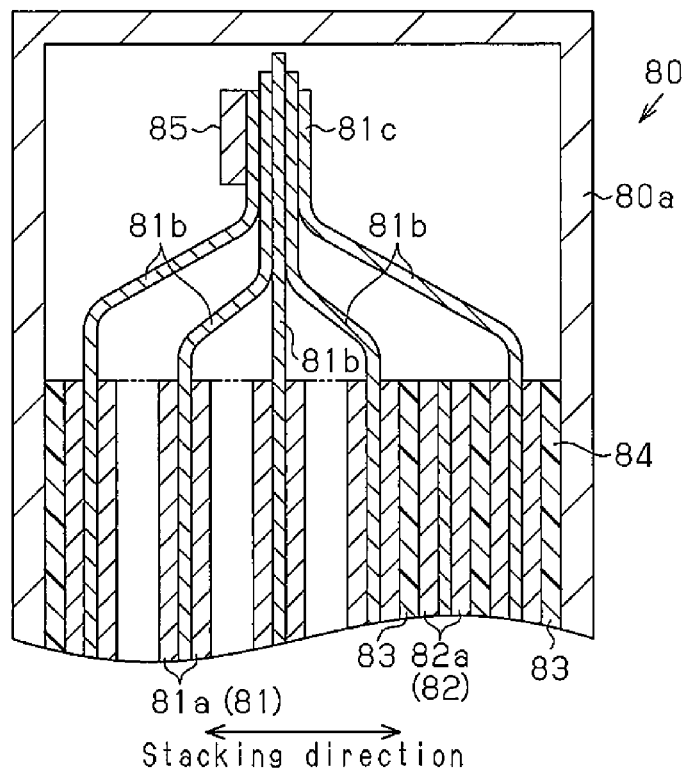
FIG. 24 is an enlarged cross-sectional view showing a portion of a conventional rechargeable battery.

As shown in FIG. 23, the insulator 31 may include terminal engagement portions 31d at opposite longitudinal ends. Each terminal engagement portion 31d is an arcuate recess. One of the terminal engagement portions 31d engages the projection 231a of the positive terminal 23a, and the other terminal engagement portions 31d engages the projection 231b of the negative terminal 23b.

In such a structure, the engagement of the terminal engagement portions 31d with the positive and negative terminals 23a and 23b limits movement of the insulator 31 toward the positive terminal 23a or the negative terminal 23b and movement of the insulator 31 in the stacking direction of the electrode assembly 11. This facilitates the coupling of the electrode assembly 11 and the insulator 31 to the case 20.

The insulator 31 may include a lock portion that locks the connection surfaces 193a and 193b of the power collection portion connecting portions 26a and 26b. In addition, the positive collector 19a and the negative collector 19b may include recesses 191a and 191b in the power collection portion connecting portions 26a and 26b, respectively. The recesses 191a and 191b function as positioning portions. Further, the insulator 31 may include engagement protrusions 32a and 32b that engage the recesses 191a and 191b.

The secondary insulation portions 31b and 31c may be bent at the thin portions 312b and 312c or the notches K, which function as bending aid portions.

In the first embodiment, the secondary insulation portions 31b and 31c of the insulator 31 may extend between the electrode assembly 11 and the case 20 so that the secondary insulation portions 31b and 31c insulate the electrode assembly 11 from the case 20.

In the above embodiments, the bent portions may be formed by bending the power collection groups 12c and 13c.

In the above embodiments, the power collection groups 12c and 13c do not have to be bent. For example, the power collection groups 12c and 13c may extend perpendicular to the stacking direction of the electrode assembly 11 and the distal ends of the power collection groups 12c and 13c may be connected to the positive collector 19a and the negative collector 19b, respectively.

In the above embodiments, an individual insulator may be provided for each of the power collection group 12c of the positive sheets 12 and the power collection group 13c of the negative sheets 13.

In the above embodiments, an insulator may be provided only for the power collection group 12c of the positive sheets 12, and the positioning may be achieved by positioning portions.

In the above embodiments, an insulator may be provided only for the power collection group 13c of the negative sheets 13, and the positioning may be achieved by positioning portions.

In the first embodiment, the locking portions 33b and 33c of the insulator 31 may be omitted.

In the first embodiment, the recesses 191a and 191b and the engagement protrusions 32a and 32b are circular as viewed from above. However, the recesses and the engagement protrusions may be tetragonal or triangular as viewed from above, for example. If the recesses and the engagement protrusions are tetragonal or triangular as viewed from above, the engagement between the recesses and the engagement protrusions limits rotations of the positive collector 19a and the negative collector 19b relative to the insulator 31.

In the first embodiment, the positive collector 19a and the negative collector 19b may include protrusions as positioning portions, and the insulator 31 may include engagement recesses that are engageable with the protrusions.

In the first embodiment, the recess 191a of the positive collector 19a may extend through the positive collector 19a in the thickness direction. In addition, the recess 191b of the negative collector 19b may extend through the negative collector 19b in the thickness direction.

In the first embodiment, the recesses 191a and 191b of the positive collector 19a and the negative collector 19b may be omitted. Further, the engagement protrusions 32a and 32b of the insulator 31 may be omitted.

In the first embodiment, the locking portions 33b and 33c are triangular. However, the locking portions 33b and 33c may be tetragonal, for example. The locking portions 33b and 33c may have any shape.

In the first embodiment, the locking portions 33b and 33c extend over the entire longitudinal length of the secondary insulation portions 31b and 31c. However, the secondary insulation portions 31b and 31c may extend over part of the longitudinal length of the secondary insulation portions 31b.

In the first embodiment, the longitudinal length of the primary insulation portion 31a is shorter than the distance between the projection 231a of the positive terminal 23a that projects in the case 20 and the projections 231b of the negative terminal 23b that projects in the case 20. However, the present invention is not limited to this structure. For example, the primary insulation portion 31a may have a longitudinal length that allows the insulator 31 to cover the entire opposing surfaces 192a and 192b of the positive collector 19a and the negative collector 19b.

In the above embodiments, the power collection group 12c of the positive sheets 12 and the power collection group 13c of the negative sheets 13 may extend away from each other. In this case, an individual insulator needs to be provided for each of the power collection group 12c of the positive sheets 12 and the power collection group 13c of the negative sheets 13.

In the above embodiments, a collector may extend only from one of a set of positive sheets 12 and a set of the negative sheets 13.

In the above embodiments, the sheet-shaped positive sheets 12 and the negative sheets 13 are used as positive and negative electrodes. However, the present invention is not limited to this structure. For example, positive electrodes and negative electrodes may be planar and have a predetermined thickness.

In the above embodiments, the electrode assembly 11 includes the positive sheets 12, the negative sheets 13, and the separators that are stacked in one direction. The separators 14 are arranged between the positive sheets 12 and the negative sheets 13. However, the present invention is not limited to this structure. For example, a wound electrode assembly may be used in which a separator strip is arranged between a positive electrode strip and a negative electrode strip and the separator strip and the electrode strips are spirally wound about the winding axis. The wound electrode assembly refers to an electrode assembly that includes a positive electrode, a negative electrode, and a separator that are stacked in succession and wound.

The present embodiment is not limited to the rechargeable battery 10 for vehicles and may be embodied in rechargeable batteries used for other purposes.

The present embodiment is not limited to the rechargeable battery 10 and may be embodied in other power storage devices such as an electric double-layer capacitor.

The technical concepts described below may be recognized from the above-described embodiments and modified examples.

(1) A power storage device in which at least one of end portions that form opposing sides of the collector includes a recess or a protrusion, and the insulator includes an engagement protrusion or engagement recess that is engageable with the recess or the protrusion.

(2) A power storage device comprising an electrode assembly in which positive electrodes and negative electrode are alternately stacked, with the positive electrodes insulated from the negative electrodes, and a collector connected to a power collection group to collect electricity from at least either one of the positive electrodes and the negative electrodes, wherein at least either one of the positive electrodes and the negative electrodes each includes an end defining a power collection portion, wherein the power collection portions of the at least either one of the positive electrodes and the negative electrodes are gathered in the power collection group, the electrode assembly and the collector are accommodated in a case, the power storage device being characterized in that a power collection group of the positive electrodes and a power collection group of the negative electrodes extend in the same direction, the collector includes a positive collector and a negative collector, and the power storage device includes an insulator that integrates the positive collector and the negative collector.

DESCRIPTION OF THE REFERENCE CHARACTERS

K: notch serving as bending aid portion, 10: rechargeable battery serving as power storage device, 11: electrode assembly, 12: positive sheet serving as positive electrode, 12b, 13b: power collection portion, 12c, 13c: power collection group, 121c: distal end portion, 122c: bent portion, 13: negative sheet serving as negative electrode, 19a: positive collector serving as collector, 19b: negative collector serving as collector, 191a, 191b, 199a, 199b: recess serving as positioning portion, 192a, 192b: opposing surface, 193a, 193b: connection surface, 20: case, 23: terminal wall serving as wall, 23a: positive terminal, 23b: negative terminal, 31, 91, 95: insulator, 31a: primary insulation portion, 31b, 31c: secondary insulation portion, 32a, 32b, 97a, 97b: engagement protrusion serving as positioning portion, 33b, 33c, 313b, 313c: locking portion, 70: support, 92, 95b: primary engagement portion serving as positioning portion, 93, 95c: secondary engagement portion serving as positioning portion, 96a: first engagement portion serving as positioning portion, 96b: second engagement portion serving as positioning portion, 197a: primary cut out part serving as positioning portion, 198a: first cut out part serving as positioning portion, 197b: secondary cut out part serving as positioning portion, 198b: second cut out part serving as positioning portion, 312b, 312c: thin portion serving as bending aid portion

The invention claimed is:

1. A power storage device comprising:
an electrode assembly formed by alternately stacking positive electrodes and negative electrodes, wherein the positive electrodes are insulated from the negative electrodes;
a collector connected to at least either one of a group of the positive electrodes or a group of the negative electrodes to collect electricity from the at least either one of the groups, wherein all the electrodes in the at least either one of the groups each includes an end defining a power collection portion, wherein the power collection portions of all the electrodes in the at least either one of the groups are gathered to form a single power collection group that is connected to the collector;
a case accommodating the electrode assembly and the collector; and
a terminal extending through a terminal wall of the case and connected to the collector, wherein
the power collection group projects from one surface of the electrode assembly that faces the terminal wall,
the power collection group includes a proximal end portion, a distal end portion, and a bent portion located between the proximal end portion and the distal end portion,
the power collection group is curved or bent at the bent portion so that a section of the power collection group from the bent portion to the distal end portion extends in the stacking direction of the positive electrodes and the negative electrodes,
the collector is a planar member extending in the stacking direction, the planar member including a connection surface, which faces the electrode assembly and is connected to the power collection group, and an opposing surface, which is opposite to the connection surface and faces the terminal wall of the case,
an insulator is located between the collector and the terminal wall of the case and separates the opposing surface from the terminal wall of the case, and
at least one of the collector and the insulator includes a positioning portion adapted to position the insulator and the collector relative to each other,
the opposing surface of the collector contacting the insulator.

2. The power storage device according to claim 1, wherein the positioning portion includes a recess or a protrusion, which is included in the opposing surface, and an engagement protrusion or an engagement recess, which is located in the insulator and engageable with the projection or the recess.

3. The power storage device according to claim 1, wherein the insulator includes a locking portion that locks the connection surface.

4. The power storage device according to claim 1, comprising a support that is located between the distal end portion of the power collection group and the electrode assembly and capable of supporting the distal end portion.

5. The power storage device according to claim 1, wherein the positioning portion includes a hook-shaped engagement portion located in the insulator to be engageable with the collector.

6. The power storage device according to claim 5, wherein the positioning portion includes the engagement portion and a cut out part formed in the collector to be engageable with the engagement portion.

7. The power storage device according to claim 1, wherein the insulator includes a primary insulation portion, which is located between the opposing surface and the terminal wall of the case, and secondary insulation portions, which extend from opposite sides of the primary insulation portion toward the electrode assembly, and
the secondary insulation portions are located at opposite sides of the collector in the stacking direction of the positive electrodes and the negative electrodes.

8. The power storage device according to claim 7, wherein the insulator includes a locking portion that locks the connection surface,
the secondary insulation portions are bent from the opposite sides of the primary insulation portion so that the locking portion locks the connection surface, and
the opposite sides of the primary insulation portion each include a bending aid portion for a corresponding one of the secondary insulation portions.

9. The power storage device according to claim 8, wherein an outer side of each secondary insulation portion is in contact with an inner surface of the case.

10. The power storage device according to claim 1, wherein the terminal includes a positive terminal and a negative terminal, the collector includes a positive collector and a negative collector, the positive collector and the negative collector are respectively connected to the positive terminal and the negative terminal, and the insulator has a length that allows for contact with the positive terminal and the negative terminal.

11. The power storage device according to claim 10, wherein the insulator includes two ends respectively facing the positive terminal and the negative terminal, and each of the two ends includes an arcuate recess.

* * * * *